(12) United States Patent
Fukui

(10) Patent No.: US 10,228,716 B2
(45) Date of Patent: Mar. 12, 2019

(54) PEDAL HOLDING DEVICE

(75) Inventor: Hiroki Fukui, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/348,938

(22) PCT Filed: Nov. 9, 2011

(86) PCT No.: PCT/JP2011/075815
§ 371 (c)(1),
(2), (4) Date: Apr. 1, 2014

(87) PCT Pub. No.: WO2013/069108
PCT Pub. Date: May 16, 2013

(65) Prior Publication Data
US 2014/0251067 A1    Sep. 11, 2014

(51) Int. Cl.
G05G 7/04    (2006.01)
G05G 1/46    (2008.04)
B60T 7/06    (2006.01)
G05G 1/44    (2008.04)

(52) U.S. Cl.
CPC ............... G05G 1/46 (2013.01); B60T 7/06 (2013.01); G05G 1/44 (2013.01); G05G 7/04 (2013.01); *Y10T 74/20528* (2015.01)

(58) Field of Classification Search
CPC .............. G05G 1/30; G05G 1/46; B60T 11/18
See application file for complete search history.

(56) References Cited

U.S. PATENT DOCUMENTS

| 3,142,199 A * | 7/1964 | Burton et al. ........... 74/516 |
| 3,858,457 A * | 1/1975 | Mathues ................. 74/512 |
| 2002/0038577 A1 | 4/2002 | Bialk et al. |
| 2002/0088303 A1 | 7/2002 | Hayashihara et al. |

(Continued)

FOREIGN PATENT DOCUMENTS

| EP | 2281724 A1 * | 2/2011 |
| JP | A-7-205776 | 8/1995 |
| JP | 07334261 A * | 12/1995 |

(Continued)

OTHER PUBLICATIONS

May 16, 2017 extended European Search Report issued in Application No. 11875476.1.

*Primary Examiner* — Vicky A Johnson
(74) *Attorney, Agent, or Firm* — Oliff PLC

(57) ABSTRACT

A pedal holding device includes: a four-bar linkage including four links and four joints that connect the four links. Two of the four joints serve as two fixed joints that are provided in a main body of the pedal holding device. One of the four links, which is not connected to the two fixed joints, serves as an intermediate link that is provided with a pedal, such that the pedal is not pivotable relative to the intermediate link. One of four internal angles each defined by corresponding adjacent two of the four links becomes not smaller than 180° at at least one moment in a period of movement of the pedal from its rearward end position to its forward end position. Non-adjacent two of the four links intersect with each other apparently when the pedal is positioned in one of the forward end position and the rearward end position.

8 Claims, 9 Drawing Sheets

(56) References Cited

U.S. PATENT DOCUMENTS

2003/0047022 A1     3/2003   Gohbrandt et al.
2009/0095100 A1     4/2009   Toyohira et al.

FOREIGN PATENT DOCUMENTS

| JP | A-7-334261 | | 12/1995 | |
|---|---|---|---|---|
| JP | A-8-42612 | | 2/1996 | |
| JP | 2002-132362 A | | 5/2002 | |
| JP | 2002132362 A | * | 5/2002 | ............... G05G 1/14 |
| JP | A-2003-530634 | | 10/2003 | |
| JP | 2009-090932 A | | 4/2009 | |
| JP | A-2009-90838 | | 4/2009 | |
| JP | 2009166811 A | * | 7/2009 | |
| JP | A-2009-166811 | | 7/2009 | |

\* cited by examiner

WATT'S FORM

PEDAL HOLDING DEVICE

TECHNICAL FIELD

The present invention relates to a pedal holding device for holding a pedal that is to be operated by an operator.

BACKGROUND ART

Patent Documents 1 and 2 disclose pedal holding devices each of which includes a four-bar linkage having four links and four joints connecting the four links. Two of the four joints serve as fixed joints that are provided in a main body of the pedal holding device. One of the four links, which is not connected to either of the two fixed joints, serves as an intermediate link. A brake pedal is provided in the intermediate link so as to be non-pivotable relative to the intermediate link. In each of the pedal holding devices disclosed in the Patent Documents 1 and 2, in a period of movement of the brake pedal from its rearward end position to its forward end position, two of the four links, which are not adjacent to each other, are never caused to apparently intersect with each other in a side view of the four-bar linkage, and the largest one of internal angles of a quadrangle that is defined by the four-bar linkage is always smaller than 180°.

Patent Document 3 discloses a pedal holding device which includes a four-bar linkage having four links and four joints connecting the four links. One of the four joints serves as a fixed joint that is provided in a main body of the pedal holding device. Two of the four links, which are connected to the fixed joint, serve as first and second links. An output member is connected to the first link. A third link is connected to the second link. A fourth link, which is connected to the first and third links, is provided with a brake pedal, such that the brake pedal is not pivotable relative to the fourth link.

Patent Document 4 discloses a pedal holding device which includes a four-bar linkage having four links and four joints connecting the four links. Two of the four joints serve as fixed joints that are provided in a main body of the pedal holding device. One of the four links, which is connected to one of the two fixed joints, is provided with a brake pedal, such that the brake pedal is not pivotable relative to the one of the four links.

PRIOR ART DOCUMENTS

Patent Documents

[Patent Document 1] JP-2009-090838A
[Patent Document 2] JP-H07-334261A
[Patent Document 3] JP-2009-166811A
[Patent Document 4] JP-H07-205776A

DISCLOSURE OF THE INVENTION

Object to be Achieved by the Invention

An object of the present invention is to improve an operability of a pedal, for example, by causing a trajectory of an operated portion of the pedal to approximate a movement of a foot of an operator during a period of movement of the pedal from its rearward end position to its forward end position.

Measures for Achieving the Object and Effect

A pedal holding device according to the present invention includes, for example, a four-bar linkage having four links and four joints that connect the four links. Two of the four joints serve as fixed joints that are provided in a main body of the pedal holding device. One of the four links, which is not connected to the two fixed joints, serves as an intermediate link that is provided with a pedal, such that the pedal is not pivotable relative to the intermediate link. The four-bar linkage is constructed to takes Parallel II form or Watt's form at at least one moment during a period of movement of the pedal from its rearward end position to its forward end position.

For example, where a brake pedal as the pedal is operated by an operator, it is common that the operator pivots his foot about his ankle with his heel being fixed at an initial stage of depression of the brake pedal. It is therefore preferable that an operated portion (i.e., portion including a pedal surface) of the brake pedal is moved diagonally in a forward downward direction. Further, in a range of large stroke of the brake pedal, it is common that the operator depresses the pedal by moving the entire foot forwardly with the heel being floated, namely, by moving the foot along a line connecting his waste and a point (that lies on the operated portion) at which the foot is in contact with the pedal. It is therefore preferable that the operated portion of the brake pedal is moved at a substantially constant height.

On the other hand, in the pedal holding device according to the present invention, the four-bar linkage can be constructed, for example, such that a pivot radius of the brake pedal is smaller in a rage of large stroke of the pedal than in a range of small stroke of the pedal. Consequently, the operated portion of the pedal can be moved diagonally in a forward downward direction in the range of small stroke, and can be moved forwardly at a substantially constant height in the range of large stroke. Further, in the pedal holding device according to the present invention, it is also possible to construct the four-bar linkage such that the pivot radius is increased with increase of stroke of the pedal in the range of large stroke. With the increase of the pivot radius, a trajectory of the operated portion of the pedal becomes substantially straight. Consequently, in the range of large stroke, the operated portion can be moved substantially straight.

Thus, in the pedal holding device according to the present invention, where the pedal is a brake pedal, it is possible to cause the trajectory of the operated portion of the brake pedal to approximate a movement of the foot of the operator who operates the brake pedal, and accordingly to improve an operability of the brake pedal.

Where a clutch pedal as the pedal is operated by an operator, it is known that the operator moves the foot straightly while floating the heel. It is therefore preferable that the operated portion of the pedal is moved at a substantially constant height.

On the other hand, in the pedal holding device according to the present invention, the four-bar linkage can be constructed, for example, such that a pivot center of the clutch pedal becomes far from the operated portion of the clutch pedal as the stroke of the clutch pedal is increased. Consequently, the operated portion of the clutch pedal can be moved substantially straight. Thus, it is possible to cause the trajectory of the operated portion of the clutch pedal to approximate a movement of the foot of the operator who operates the clutch pedal, and accordingly to improve an operability of the clutch pedal.

Claimable Inventions

There will be described inventions deemed to be claimable or features contained in the inventions.

(1) A pedal holding device for holding a pedal that is to be operated by an operator, said pedal holding device being characterized by comprising:

a four-bar linkage including four links and four joints that connect said four links, wherein two of said four joints serve as two fixed joints that are provided in a main body of said pedal holding device, wherein one of said four links, which is not connected to said two fixed joints, serves as an intermediate link that is provided with the pedal, such that the pedal is not pivotable relative to said intermediate link, and wherein said four-bar linkage is constructed such that one of four internal angles becomes not smaller than 180°, in a side view of said four-bar linkage, at at least one moment in a period of movement of the pedal from a rearward end position thereof to a forward end position thereof, each of said four internal angles being defined by corresponding adjacent two of said four links.

Each of the forward end position and the rearward end position is a position that is determined structurally, for example, by elements such as a stopper and a spring.

The rearward end position corresponds to a position (i.e., non-operated position) in which the pedal is to be positioned when an operating force (i.e., depressing force) is not applied to the pedal by the operator, and corresponds to a position (i.e., home position) in which the pedal is to be positioned when the application of the operating force to the pedal by the operator is removed. The rearward end position may be, for example, a position determined by a stopper or the like that is provided in the pedal holding device.

The forward end position corresponds to a position beyond which the pedal cannot be further moved forwardly, and corresponds to a position in which the pedal is to be positioned when the pedal is fully stroked. The forward end position may be, for example, (a) a position determined by a stopper or the like that is provided in the pedal holding device, (b) a position determined by a construction of a manual hydraulic-pressure generator (e.g., master cylinder equipped with booster) where an input member (e.g., pushrod) of the manual hydraulic-pressure generator is connected to the pedal holding device, or (c) a position determined by a direction of movement of an output member of the pedal. In case of (b), the input member of the manual hydraulic-pressure generator may be regarded as the output member of the pedal, and the position may be determined by a stopper that determines a forward end position of a pressurizing piston linked to the pushrod. In case of (c), the position may be, for example, a position in which the stroke of the pedal is maximized within a range in which the depressing force applied to the pedal is satisfactorily transmittable to the manual hydraulic-pressure generator.

The term "period of movement of said pedal from a rearward end position thereof to a forward end position thereof" includes a case when the pedal is positioned in the rearward end position, a case when the pedal is positioned in the forward end position and a case when the pedal is positioned between the rearward end position and the forward end position.

The term "stroke" means "travel", and can be represented by, for example, an angle by which the pedal has been pivoted from the rear end position or a distance over which the operated portion of the pedal has been moved from the rear end position.

The term "each of said four internal angles defined by corresponding adjacent two of said four links" corresponds to an angle as seen from a side of the four-bar linkage (i.e., as seen from a width direction of the vehicle), and corresponds to an angle in a projection view that is projected from a side of the four-bar linkage. It is noted that, in the following description, the angle as seen from a side of the four-bar linkage will be referred to as the angle in a side view of the four-bar linkage. Further, the term "internal angle" is determined by a shape of the four-bar linkage in the side view, and corresponds to an angle inside two adjacent sides of a polygon that is defined by the four links. There is a case when two links are arranged apparently in a straight line, namely, three adjacent joints (including the fixed joint) are arranged apparently in a straight line, in the side view of the four-bar linkage. In this case, "the internal angle defined by the two adjacent links" is 180°. Although such a relative positional relationship in which two links are arranged in a straight line is not actually established, there is a case when two links appear to be arranged in a straight line, as seen from a side of the four-bar linkage. In the present specification, the term "apparently" will be used, where appropriate, for expressing such a relative positional relationship in the side view (i.e., relative positional relationship in a projection view), which could be different from a relative positional relationship.

A form of the four-bar linkage is categorized into three, depending on the shape of the four-bar linkage in the side view. The shape is determined by the relative positional relationship among the four links of the four-bar linkage. In the four-bar linkage, there are a case (e) where neither of two pairs of non-adjacent links intersect with each other and a case (f) where one of the two pairs of non-adjacent links apparently intersect with each other, wherein each one of the two pairs of non-adjacent links consists of two of the four links, which are not adjacent to each other. In the former case (e), the four-bar linkage in which all of internal angles (each defined by corresponding two adjacent links) are smaller than 180° ($\pi$) (namely, even the largest one of the internal angles is smaller than 180°), is referred to as Parallel I form (First form), while the four-bar linkage in which one of the internal angles is not smaller than 180° is referred to as Parallel II form (Second form). The four-bar linkage of the latter case (f) is referred to as Watt's form (Third form).

It is common that the form of the four-bar linkage refers to a form that is determined based on the shape of the four-bar linkage which is established when the pedal is positioned in the rearward end position. However, the shape of the four-bar linkage is changed as the pedal is operated, and there are a case (x) where the form of the four-bar linkage is changed by the change of the shape and a case (y) where the form of the four-bar linkage is not changed by the change of the shape. In the pedal holding device according to this mode, the four-bar linkage takes Parallel II form at at least one moment during the period of movement of the pedal from the rearward end position to the forward end position. For example, there are a case (i) where the four-bar linkage takes Parallel II form when the pedal is positioned in the rearward end position, and takes Parallel I form or Watt's form when the pedal is positioned in the forward end position, a case (ii) where the four-bar linkage takes Parallel I form or Watt's form when the pedal is positioned in the rearward end position, and takes Parallel II form when the pedal is positioned in the forward end position, a case (iii) where the four-bar linkage takes Parallel II form at one moment during the period of movement of the pedal from the rearward end position to the forward end position (i.e., where the four-bar linkage takes Parallel I form or Watt's form when the pedal is positioned in the rearward end position, takes Watt's form or Parallel I form when the pedal is positioned in the forward end position, and takes Parallel II form when the pedal is on the way between the rearward end position and the forward end position), and a case (iv) where the four-bar linkage takes Parallel II form throughout the period of movement of the pedal from the rearward end position to the forward end position (i.e., where the largest internal angle is kept not smaller than 180° in spite of change of the relative positional relationship).

Meanwhile, the pivot center of the pedal lies on an axis extending in the width direction and passing through an intersection at which two (hereinafter referred to as sub-links) of the four links intersect with each other in the side view, wherein the two sub-links connect between the other two of the four links which are referred to as a fixed link and an intermediate link. It is noted that the intersection may be an intersection at which extensions of the respective two sub-links intersect with each other. The intermediate link is moved with increase of the stroke of the pedal, and each of the two sub-links is pivoted by the movement of the intermediate link, whereby the relative positional relationship between the two sub-links is changed. The change of the relative positional relationship leads to movement of the intersection of the two sub-links in the side view. In this sense, the pivot center of the pedal may be referred to as an instantaneous pivot center. Where the four-bar linkage takes Parallel II form, the pivot center lies on one of the two sub-links in the side view, so that it is possible to cause the pivot radius to be changed largely with the increase of stroke of the pedal. It is noted that the pivot radius corresponds to a distance between the pivot center and a predetermined point (hereinafter referred to as a reference point) that lies on the operated portion of the pedal.

Where the four-bar linkage takes Parallel I form or Watt's form, the pivot center is located outside the four-bar linkage. Therefore, in the four-bar linkage that always takes Parallel I form or Watt's form throughout the period of movement of the pedal from the rearward end position to the forward end position, it is difficult to cause the pivot radius to be changed largely with the change of the stroke of the pedal.

On the other hand, where the four-bar linkage takes Parallel II form at at least one moment during the period of movement of the pedal from the rear end position to the forward end position, it is easier to cause the pivot radius to be changed largely with the change of stroke of the pedal, as compared with where the four-bar linkage always takes Parallel I form or Watt's form. Consequently, it is possible to increase a degree of freedom in designing the trajectory of the pedal, and accordingly to design the pedal holding device such that the pedal can be moved along the trajectory that is suitable for the operation made by the operator.

(2) The pedal holding device according to mode (1), wherein said four-bar linkage is constructed such that one of said four internal angles is not smaller than 180° when the pedal is positioned in at least one of the rearward end position and the forward end position.

The above-described cases (i), (ii), (iv) correspond to the pedal holding device described in this mode.

(3) The pedal holding device according to mode (1) or (2), wherein said four-bar linkage is constructed such that a largest one of said four internal angles is smaller than 180° when the pedal is positioned in one of the forward end position and the rearward end position.

The above-described cases (i), (ii), (iii) correspond to the pedal holding device described in this mode.

(4) The pedal holding device according to any one of modes (1)-(3), wherein said four-bar linkage is constructed such that non-adjacent two of said four links intersect with each other apparently in the side view of said four-bar linkage when the pedal is positioned in one of the forward end position and the rearward end position, said non-adjacent two of said four links being one of two pairs of non-adjacent links, each of said two pairs of non-adjacent links consisting of two non-adjacent links that are not adjacent to each other.

The above-described case (i) includes an arrangement in which the form of the four-bar linkage is changed from Parallel II form to Watt's form. The above-described case (ii) includes an arrangement in which the form of the four-bar linkage is changed from Watt's form to Parallel II form. These arrangements of the respective cases (i) and (ii) and also the above-described case (iii) correspond to the pedal holding device described in this mode. When the four-bar linkage takes Watt's form, there are a case where the fixed and intermediate links (that are not adjacent to each other) intersect with each other apparently in the side view and a case where the two sub-links (that are not adjacent to each other) intersect with each other apparently in the side view.

(5) The pedal holding device according to any one of modes (1)-(4), wherein said four-bar linkage is constructed such that a form of said four-bar linkage is changed between at least two forms in the period of movement of the pedal from the rearward end position to the forward end position, and wherein said at least two forms include a second form and at least one of first and third form, where (i) said first form is that none of two pairs of non-adjacent links, each pair consisting of non-adjacent two of said four links which are not adjacent to each other, intersect with each other, with all of said four internal angles being smaller than 180°, in the side view of said four-bar linkage, (ii) said second from is that none of said two pairs of non-adjacent links intersect with each other, with one of said four internal angles being not smaller than 180°, in the side view of said four-bar linkage, and (iii) said third form is that one of said two pairs of non-adjacent links intersect with each other apparently in the side view of said four-bar linkage.

The first form corresponds to Parallel I form, the second form corresponds to Parallel II form, and the third form corresponds to Watt's form.

(6) The pedal holding device according to any one of modes (1)-(5), wherein a fixed link as one of said four links, which is connected to said two fixed joints, has a length larger than a length of each of the other of said four links.

In the four-bar linkage in which the fixed link is the longest among the four links, the shape of Parallel II form can be easily established.

(7) The pedal holding device according to any one of modes (1)-(6), wherein the pedal includes (a) an arm portion that is held at an end portion thereof by said main body of said pedal holding device and (b) an operated portion that is provided in another end portion of said arm portion, and wherein said four-bar linkage is constructed such that a pivot radius of the pedal is changed with change of stroke of the pedal from the rearward end position, the pivot radius corresponding to a distance between a predetermined reference point which lies on the operated portion of the pedal and a pivot center of the pedal about which the pedal is to be pivoted.

(8) The pedal holding device according to mode (7), wherein said four-bar linkage is constructed such that said pivot center of the pedal is moved with the change of the stroke of the pedal from the rearward end position.

The pivot center is moved with the change of the stroke of the pedal, and may be referred to as an instantaneous pivot center.

When the pedal is positioned in the rearward end position, it is common that the pivot center is positioned on a front side of the operated portion of the pedal. It is common that the pivot center is moved generally rearward or forward (i.e., in a direction including a component of the longitudinal direction), with increase of the stroke of the pedal.

(9) The pedal holding device according to mode (7) or (8), wherein said four-bar linkage is constructed such that said pivot radius of the pedal is smaller when the stroke of the pedal is large than when the stroke of the pedal is small.

The phrase "said pivot radius of the pedal is smaller when the stroke of the pedal is large than when the stroke of the pedal is small" is interpreted to mean that the pivot radius is relatively smaller in a range of large stroke of the pedal than in a range of small stroke of the stroke, and is not limited to an arrangement where the pivot radius is monotonously reduced (i.e., continuously reduced) with increase of the stroke of the pedal.

For example, the above phrase is interpreted to mean that an average value of the pivot radius R is smaller when the stroke S is larger than a given stroke Sth (S>Sth) than the stroke S is not larger than the given stroke Sth (S≤Sth). The given stroke Sth may be, for example, a value that is determined in accordance with the following expression:

$$Sth = \alpha \cdot Smax,$$

where "Smax" represents a maximum stroke that corresponds to the stroke of the pedal when the pedal is positioned in the forward end position, and "α" may be any value such as 0.4 and 0.5 as long as it satisfies $0<\alpha<1$.

(10) The pedal holding device according to mode (9), wherein said four-bar linkage is constructed such that said pivot radius of the pedal is reduced with increase of the stroke of the pedal.

In the pedal holding device described in this mode, the pivot radius is reduced as the stroke of the pedal is increased, and the pivot center becomes close to the reference point as the stroke of the pedal is increased.

(11) The pedal holding device according to mode (9), wherein said four-bar linkage is constructed such that said pivot radius of the pedal is reduced and then increased with increase of the stroke of the pedal.

In the pedal holding device described in this mode, the pivot center becomes close to the reference point and then becomes far from the reference point, as a result of increase of the stroke of the pedal, whereby the pivot radius is increased after having been reduced.

For example, in an arrangement where the pivot radius is reduced with increase of the stroke, the pivot radius could be reduced too much in a range of large stroke of the pedal. If the pivot radius becomes too small, the direction of movement of the operated portion of the pedal would be upward at a high gradient, whereby the operability could be worsened. On the other hand, where the pivot radius is increased in the range of large stroke of the pedal, it is possible to prevent reduction of the operability due to the extreme reduction of the pivot radius.

(12) The pedal holding device according to mode (7) or (8), wherein said four-bar linkage is constructed such that said pivot radius of the pedal is larger when the stroke of the pedal is large than when the stroke of the pedal is small.

The pivot center becomes far from the reference point as the stroke of the pedal is increased, so that the pivot radius is increased as the stroke of the pedal is increased. The pedal holding device described in this mode is suitable where the pedal is a clutch pedal.

(13) The pedal holding device according to any one of modes (1)-(12), wherein one of said four links, which is connected to one of said two fixed joints, is provided with a connection portion to which an output member is connected, such that a force corresponding to an input applied to the pedal is outputted to an external device through the output member.

Where the pedal is a brake pedal, the force corresponding to the input applied to the brake pedal is outputted through the output member, and is then applied to the external device in the form of a manual hydraulic-pressure generator or a reaction-force applying device. The output member corresponds to an input member of the manual hydraulic-pressure generator or reaction-force applying device. The above-described one of the four links is provided with the connection portion to which the output member is connected.

The output member has generally a rod-like shape. The output member is connected at an end portion thereof to the connection portion of one of two sub-links, such that the output member is pivotable relative to the one of the two-sub-links. Further, the output member is connected at another end portion thereof to an actuator member of the reaction-force applying device or manual hydraulic-pressure generator, such that the output member is pivotable relative to the actuator member.

The reaction-force applying device may be constituted by a stroke simulator. The manual hydraulic-pressure generator may be constituted by a master cylinder or a mater cylinder equipped with a booster, for example. The actuator member may be constituted by a pressurizing piston or a power piston. There is a case where the manual hydraulic-pressure generator has a function serving as the reaction-force applying device. Further, it is also possible to consider that the manual hydraulic-pressure generator is a kind of the reaction-force applying device.

In the manual hydraulic-pressure generator, the actuator member (e.g., pressurizing piston, power piston) is moved forwardly with forward movement of the output member, whereby a manual hydraulic pressure is generated. A reaction force corresponding to the manual hydraulic pressure is applied to the brake pedal. It can be considered that the pedal output member is a pushrod.

In the stroke simulator, the actuator member of the stroke simulator is moved forwardly with forward movement of the output member, whereby an elastic member is compressed so that a reaction force is applied to the pedal.

(14) The pedal holding device according to mode (13), wherein said four-bar linkage is constructed such that an output/input ratio is changed with change of stroke of the pedal from the rearward end position, the output/input ratio being a ratio of the force outputted through the output member, to the input applied to the pedal.

The output/input ratio (hereinafter referred to as a pedal ratio or a lever ratio) may be defined as a value (Fout/Fin) that is obtained by dividing an output Fout (corresponding to the input) of the output member by the input Fin applied to the brake pedal.

Further, the pedal ratio per se and a change pattern of the pedal ratio, for example, are determined based on design dimensions of the four-bar linkage (such as the relative positional relationship of the four links and lengths of the four links), so that the pedal per se and the change pattern of the pedal ratio, for example, can be tuned as desired by suitably designing the dimensions.

It is noted that the pedal ratio may be defined also as a value (Ff/Fin) that is obtained by dividing an input Ff applied to the manual hydraulic-pressure generator by the input Fin applied to the brake pedal. The output Fout of the output member and the input Ff applied to the manual hydraulic-pressure generator are not necessarily equal to each other, but have an one-to-one relationship therebetween.

(15) The pedal holding device according to mode (14), wherein said four-bar linkage is constructed such that the output/input ratio is smaller when the stroke of the pedal is large than when the stroke of the pedal is small.

Where the four-bar linkage is constructed such that the output/input ratio is larger when the stroke of the pedal is large than when the stroke of the pedal is small, it is possible to increase a boost ratio in a range of large stroke of the pedal.

On the other hand, where the four-bar linkage is constructed such that the output/input ratio is smaller when the stroke of the pedal is large than when the stroke of the pedal is small, a ratio of amount of movement of the output member to amount of change of the stroke of the pedal is smaller when the stroke is large than when the stroke is small. Consequently, when the stroke of the pedal becomes large in an operation of the brake pedal as the pedal, a state in which a braking force is controlled by controlling the stroke of the brake pedal is switched to a state in which the braking force is controlled by controlling an operating force applied to the brake pedal. This makes it possible to finely control the braking force in a range of large stroke of the brake pedal and accordingly to improve a feeling given to the operator who executes a braking operation.

It is noted that the four-bar linkage may be constructed such that the output/input ratio is increased with increase of the stroke of the pedal, or such that the output/input ratio is reduced with increase of the stroke of the pedal, or such that the output/input ratio is reduced and then increased with increase of the stroke of the pedal.

Further, the phrase "the output/input ratio is smaller when the stroke of the pedal is large than when the stroke of the pedal is small" is interpreted to mean that an average value of the output/input ratio is smaller when the actual stroke is larger than a given stroke than when the actual stroke is not larger than the given stroke, and is not limited to an arrangement where the output/input ratio is continuously reduced with increase of the stroke of the pedal.

(16) The pedal holding device according to any one of modes (1)-(15), wherein one of said four links, which is connected to one of said two fixed joints, is provided with a connection portion to which an output member is connected, such that a force corresponding to an input applied to the pedal is outputted to an external device through the output member, and wherein said four-bar linkage is constructed such that an output/input ratio is changed with change of stroke of the pedal from the rearward end position, the output/input ratio being a ratio of the force outputted through the output member, to the input applied to the pedal, and wherein said four-bar linkage is constructed such that a pivot radius of the pedal is changed with the change of the stroke of the pedal from the rearward end position.

(17) The pedal holding device according to any one of modes (1)-(16), which is provided in a vehicle, wherein said intermediate link takes a posture that is inclined, in the side view of said four-bar linkage, with respect to at least one of a longitudinal direction and a vertical direction of the vehicle when the pedal is positioned in the rearward end position.

An angle of inclination of the intermediate link with respect to the longitudinal direction is preferably not smaller than 10°, 20° or 30°, and is preferably not larger than 80°, 70° or 60.

(18) The pedal holding device according to any one of modes (1)-(17), which is provided in a vehicle, wherein said fixed link takes a posture that is inclined with respect to a longitudinal direction of the vehicle.

Where the fixed link is disposed to take a posture that is inclined with respect to the longitudinal direction, a vehicle interior can be widened as compared with an arrangement where the fixed link is disposed to take a posture that is parallel to the longitudinal direction.

(19) The pedal holding device according to any one of modes (1)-(18), wherein one of said two fixed joints is provided with a stroke sensor that is configured to obtain stroke of the pedal by detecting an angle by which two of said four links are pivoted relative to each other about said one of said two fixed joints.

The angle by which the two links are to be pivoted relative to each other about the one of the two fixed joints, namely, an angle by which the sub-link is to be pivoted relative to the fixed link has an one-to-one relationship with the angle by which the pedal is to be pivoted about the pivot center. It is therefore possible to detect the stroke of the pedal by detecting the angle by which the two links are pivoted relative to each other about the one of the two fixed joints.

It is noted that the output member is not essential. For example, one of the two fixed joints may be provided with a reaction-force applying device that is configured to apply a reaction force (e.g., an elastic force) to the pedal when the two links are pivoted relative to each other. This reaction-force applying device may be constructed to include a spring, for example. In this case, the reaction force can be applied to the pedal without provision of the output member.

(20) A pedal holding device for holding a pedal that is to be operated by an operator, said pedal holding device being characterized by comprising:

a four-bar linkage including four links and four joints that connect said four links, wherein two of said four joints serve as two fixed joints that are provided in a main body of said pedal holding device, wherein one of said four links, which is not connected to said two fixed joints, serves as an intermediate link that is provided with the pedal, such that the pedal is not pivotable relative to said intermediate link, wherein said four-bar linkage is constructed such that said four-bar linkage takes at least one of two forms at at least one moment in a period of movement of the pedal from a rearward end position thereof to a forward end position thereof, and wherein said two forms include a second form and a third form, where (i) a first form is that none of two pairs of non-adjacent links, each pair consisting of non-adjacent two of said four links which are not adjacent to each other, intersect with each other, with all of said four internal angles being smaller than 180°, in the side view of said four-bar linkage, (ii) said second from is that none of said two pairs of non-adjacent links intersect with each other, with one of said four internal angles being not smaller than 180°, in the side view of said four-bar linkage, and (iii) said third form is that one of said two pairs of non-adjacent links intersect with each other apparently in the side view of said four-bar linkage.

This mode does not encompass a pedal holding device in which the four-bar linkage takes the first form always throughout the period of movement of the pedal from the rearward end position to the forward end position.

The technical features described in any one of the above modes (1)-(19) can be employed in the pedal holding device described in this mode.

(21) A pedal holding device for holding a pedal including an arm portion and an operated portion such that the pedal is held at the arm portion by said pedal holding device, said pedal holding device being characterized by comprising:

a four-bar linkage including four links and four joints that connect said four links, wherein two of said four joints serve as two fixed joints that are provided in a main body of said pedal holding device, wherein one of said four links, which is not connected to said two fixed joints, serves as an intermediate link that is provided with the pedal, such that the pedal is not pivotable relative to said intermediate link, wherein one of said four links, which is connected to one of said two fixed joints, serves as a sub-link to which an output member is connected, and wherein said four-bar linkage is constructed such that a pivot radius of the pedal is smaller when stroke of the pedal is large than when the stroke of the pedal is small, the pivot radius corresponding to a distance between a predetermined reference point which lies on the operated portion of the pedal and a pivot center of the pedal about which the pedal is to be pivoted, and wherein said four-bar linkage is constructed such that an output/input ratio is smaller when stroke of the pedal is large than when the stroke of the pedal is small, the output/input ratio being a ratio of a force outputted through the output member, to an input applied to the pedal.

The technical features described in any one of the above modes (1)-(19) can be employed in the pedal holding device described in this mode.

(22) The pedal holding device according to any one of modes (1)-(21), wherein the pedal is a brake pedal that is to command activation of a brake provided for a wheel of a vehicle so as to brake rotation of the wheel.

Further, a pedal apparatus, which includes the brake pedal and the pedal holding device holding the brake pedal, may be referred to as a brake pedal apparatus.

MODES FOR CARRYING OUT THE INVENTION

Hereinafter, a pedal apparatus equipped with a pedal holding device according to an embodied form of the present invention will be described in detail with reference to drawings. The pedal apparatus is to be installed in a vehicle, and a pedal is to be operated by a foot of an operator of the vehicle. The pedal holding device includes a four-bar linkage.

There will be first described a form of the four-bar linkage, which is a technical matter common to a plurality of embodiments of the invention.
<Form of Four-Bar Linkage>

Figure 3:
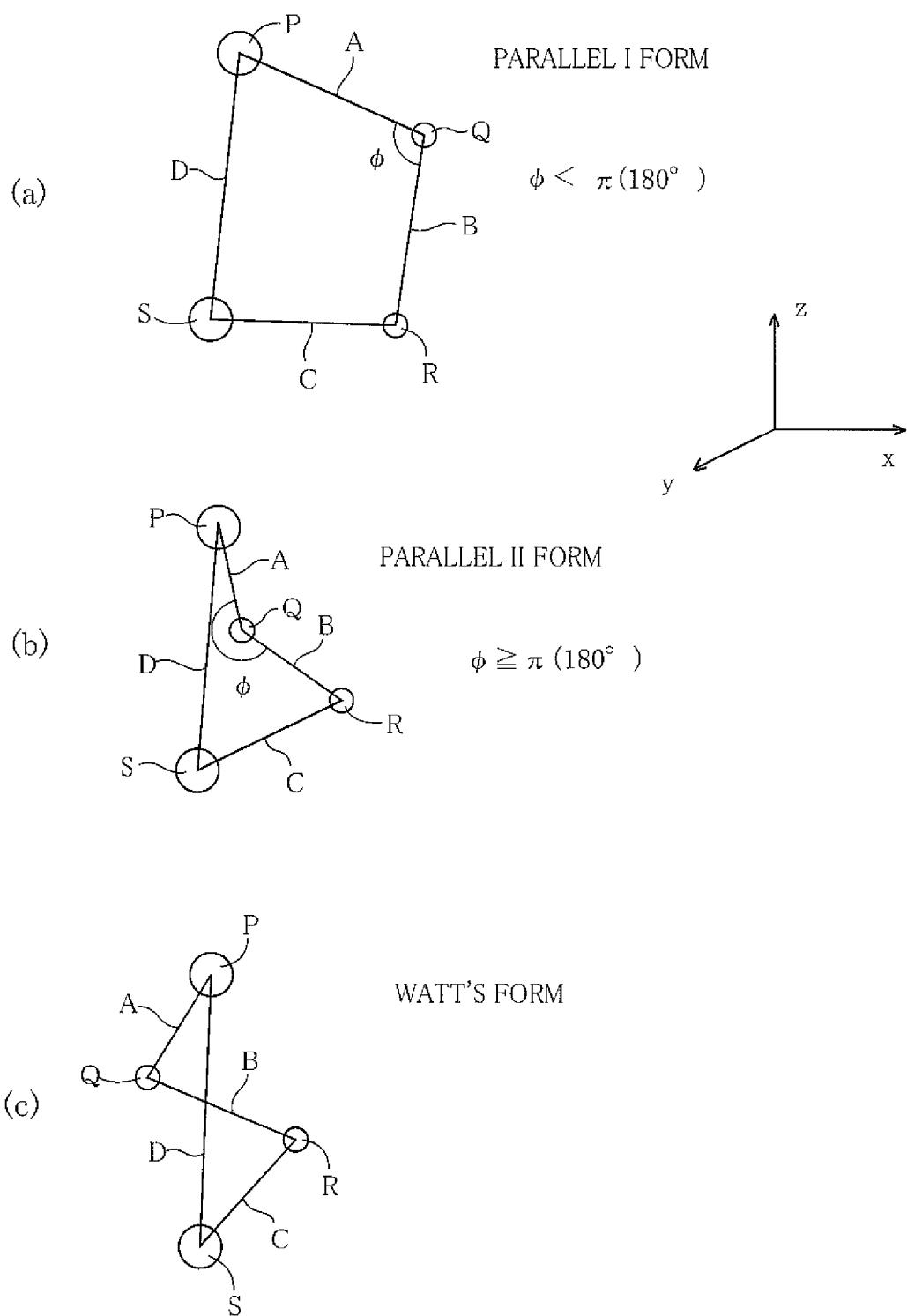
FIG. 3 is a set of view conceptually showing forms of a four-bar linkage that is included in the above-described pedal holding device, wherein view (a) shows Parallel I form, view (b) shows Parallel II form, and view (c) shows Watt's form.

The form of the four-bar linkage is categorized into three, i.e., Parallel I from shown in FIG. 3 (a), Parallel II form shown in FIG. 3 (b) and Watt's form shown in FIG. 3 (c).

The four-bar linkage includes four links A, B, C, D and four joints P, Q, R, S. Two joints P, S, which are two of the four joints P, Q, R, S, serve as fixed joints that are fixed to a main body of the pedal holding device. A link D, which is one of the four links A, B, C, D, serves as a fixed link which is connected to the fixed joints P, S and which is not moved. Meanwhile, the other links A, B, C serve as movable links. Two links A, C, which are two of the three movable links A, B, C, serve as sub-links that are connected to the fixed link D via the respective fixed joints P, S. The sub-links A, C are pivotable relative to each other and pivotable relative to the fixed link D. The sub-links A, C are connected to each other via an intermediate link B which is another one of the three movable links A, B, C. The intermediate link B is connected to the sub-links A, C via respective movable joints Q, R which are other two of the four joints P, Q, R, S, such that the intermediate link B is pivotable relative to the sub-links A, C.

The form of the four-bar linkage is determined based on a shape of four-bar linkage as seen from a side of the vehicle (in a width direction of the vehicle), namely, as seen from y-direction. Hereinafter, it will be referred to as "side view".

As shown in FIG. 3, the form of the linkage in which the links do not intersect with each other in the in the side view of the linkage is referred to as Parallel from. The form of the linkage in which the two links B, D or two links A, C intersect with each other apparently in the side view is referred to as Watt's form (corresponding to third form). In this Watt's form, the two links appear to intersect with each other in the side view, although the two links are actually spaced apart from each other, rather than actually intersecting with each other. This relative positional relationship between the two links B, D or the two links A, C is referred to as an apparent intersection. In the following description, the term "apparently" will be used to refer to a positional relationship as seen from the y-direction, which is different from an actual relative positional relationship.

The Parallel form of the four-bar linkage is categorized into two, one of which is referred to as Parallel I form (corresponding to first form) and the other of which is referred to as Parallel II form (corresponding to to second form). In Parallel I form, the largest one of four internal angles each defined by corresponding adjacent two of the four links is smaller than 180° in the side view, namely, all of the four internal angles are smaller than 180° in the side view. In Parallel II form, the largest one of the four internal angles is not smaller than 180° in the side view, namely, one of the four internal angles is not smaller than 180° in the side view. The internal angle refers to an angle inside two adjacent sides of a polygon that is defined by the four links.

In the four-bar linkage of Watt's form, two triangles are defined apparently in the in the side view of the four-bar linkage so that the largest one of the internal angles is smaller than 180°.

It is common that the form of the four-bar linkage refers to a form that is determined based on a shape of the four-bar linkage when the pedal is positioned in the rearward end position. There is a case where the form is changed with change of stroke of the pedal. The stroke refers to a distance by which the pedal has been moved from its rearward end position, or refers to an angle by which the pedal has been pivoted from its rearward end position. Further, the stroke does not necessarily refer to stroke of the pedal, and there is case where the stroke refers to stroke of the output member.

Where the intermediate link B is provided with the pedal such that the pedal is not pivotable relative to the intermediate link B, the intermediate link B is moved or pivoted as the pedal is operated whereby the sub-links A, C are pivoted so that the shape of the four-bar linkage is changed (namely, the relative positional relationship among the links A-D is changed). However, there are a case where the form of the four-bar linkage is changed and also a case where the form of the four-bar linkage is not changed, as a result of the change of the relative positional relationship among the links A-D within a range of operation of the pedal (i.e., during the period of movement of the pedal between the rearward end position and the forward end position). In the former case (where the form of the four-bar linkage is changed), as a result of the change of the relative positional relationship among the links A-D, the internal angle is changed between a value smaller than 180° and a value larger than 180° or a relative positional relationship between two links is changed between a state of intersection of the two links with each other and a state of non-intersection of the two links with each other.

In the following description as to embodiments, there will be described: a case (Embodiments 1 and 5) where the form of the four-bar linkage is changed between Parallel II form and Parallel I form within the range of operation of the pedal; a case (Embodiment 2) where the form of the four-bar linkage is changed between Watt's form and Parallel II form within the range of operation of the pedal; a case (Embodiment 4) where the form of the four-bar linkage is changed among Parallel I form, Parallel II form and Watt's form within the range of operation of the pedal; a case (Embodiment 3) where the four-bar linkage always takes Parallel II form within the range of operation of the pedal, without change of the form with change of the shape; and a case (Embodiment 6) where the four-bar linkage always takes Watt's form within the range of operation of the pedal.

It is noted that the pedal held by the pedal holding device may be any one of a brake pedal, an accelerator pedal and a clutch pedal.

Embodiment 1

Construction

Figure 1:
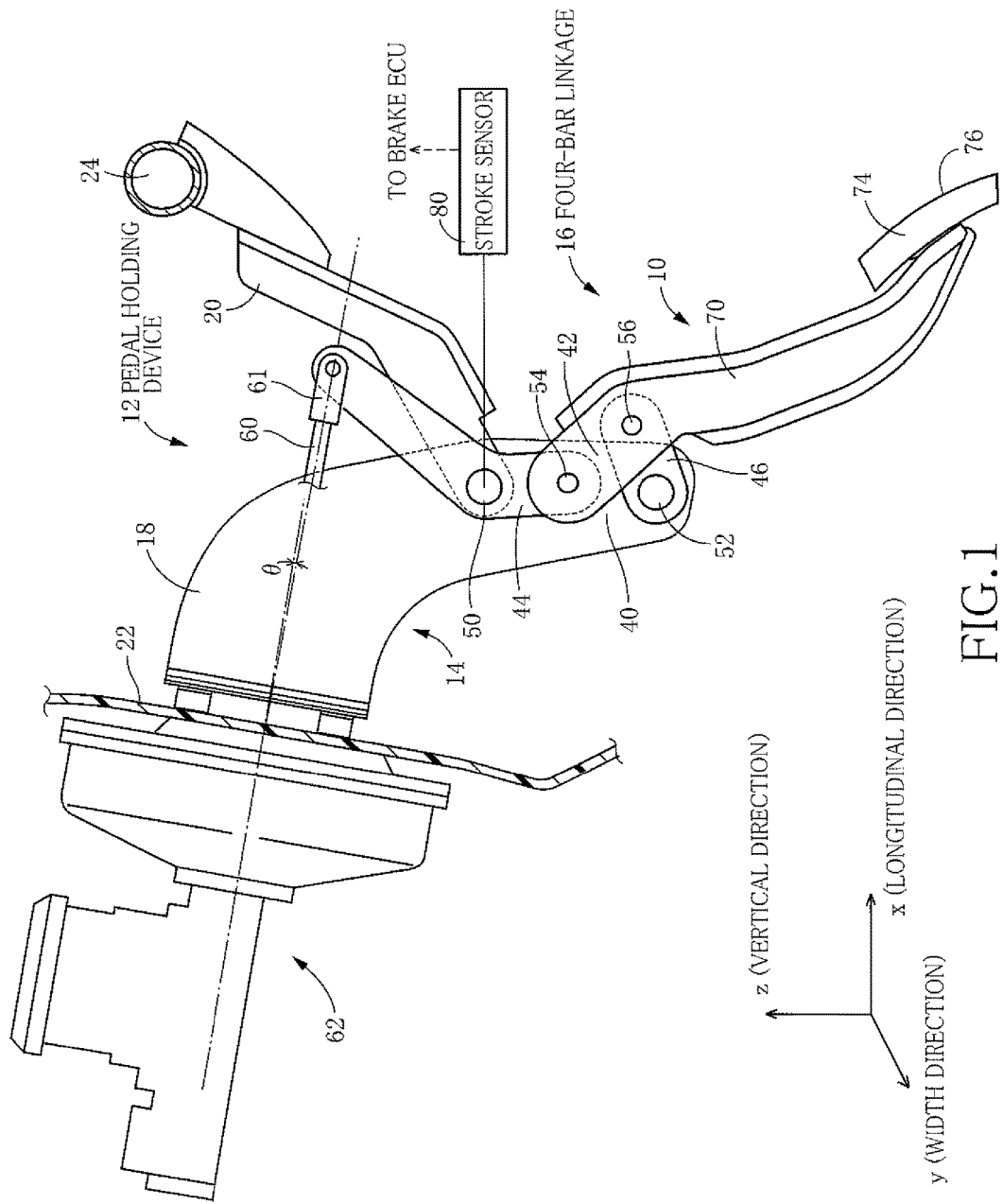
FIG. 1 is a side view showing a pedal apparatus including a pedal holding device that is constructed according to Embodiment 1.

The pedal apparatus shown in FIG. 1 includes the pedal in the form of a brake pedal 10 for a service brake (hereinafter referred simply to as a brake pedal) and also a pedal holding device 12 holding the brake pedal 10. In this sense, the pedal apparatus may be referred to as a brake pedal apparatus. In FIG. 1, x-direction corresponds to a longitudinal direction of a vehicle, y-direction corresponds to a width direction of the vehicle, and a z-direction corresponds to a vertical direction of the vehicle.

The pedal holding device 12 includes a main body 14 and a four-bar linkage 16. The main body 14 of the pedal holding device 12 includes a main bracket 18 and a sub-bracket 20. The main bracket 18 is disposed on a side of a dash panel 22 that separates an engine room and a vehicle interior from each other. The sub-bracket 20 is held by an instrument panel reinforcement 24 that is constituted by a cylindrical-shaped member extending in the width direction (i.e., y-direction) of the vehicle. The sub-bracket 20 is provided independently from the main bracket 18, so as to be located on a rear side of the main bracket 18 (so as to be spaced apart from the main bracket 18 in the x-direction).

The four-bar linkage 16 includes four links 40-46 and four joints 50-56. Among the four joints 50-56, the joints 50, 52 serve as fixed joints that are provided in the main body 14, and the joints 54, 56 serve as movable joints that are not provided in the main body 14. These joints 50-56 (each of which may include a pin or the like, for example) are provided to take respective postures which are parallel to each other and which extend in parallel to the width direction (i.e., y-direction) of the vehicle. Further, the fixed joint 50 has also a function serving to connect the main bracket 18 and the sub-bracket 20.

The link 40, which is one of the four links 40-46, serves as a fixed link that is connected at opposite end portions thereof to the fixed joints 50, 52. In the present embodiment, the main bracket 18 (more precisely, a portion of the main bracket 18 which is located between the fixed joints 50, 52) serves as the fixed link 40. The fixed link 40 has a length (corresponding to a distance between the fixed joints 50, 52) that is lager than those of the other links 42, 44, 46. Further, the link 42, which is another one of the four links 40-46, serves as an intermediate link that is not connected to either of the fixed joints 50, 52, serve as an intermediate link. The other two links 44, 46, which connect the fixed link 40 and the intermediate link 42, serve as sub-links. Each of the sub-links 44, 46 is connected at an end portion thereof to the main bracket 18 via a corresponding one of the fixed joints 50, 52, such that each of the sub-links 44, 46 is pivotable relative to the main bracket 18. Each of the sub-links 44, 46 is connected also at another end portion thereof to the intermediate link 42 via a corresponding one of the movable joints 54, 56. In other words, the intermediate link 42 is held by the main bracket 18 via the movable joints 54, 56 and the sub-links 44, 46 such that the intermediate link 42 is pivotable relative to the main bracket 18.

The intermediate link 42 is provided with the brake pedal 10 such that the brake pedal 10 is not pivotable relative to the intermediate link 42. An output member 60 is connected to the sub-link 44 via elements such as a clevis 61 such that the output member 60 is pivotable relative to the clevis 61. In the present embodiment, a connection portion is constituted by at least the clevis 61 and a portion of the sub-link 44 in which the clevis 61 is provided.

The brake pedal 10 includes an arm portion 70 and an operated portion (that may be referred also to as a pad) 74. The arm portion 70 extends generally in the vertical direction (i.e., z-direction), and is connected at two portions thereof to the sub-links 44, 46 via the movable joints 54, 56, so that the arm portion 70 is held by the main body 14 of the pedal holding device 12 via the sub-links 44, 46. The two portions of the arm portion 70 are both included in an upper portion of the arm portion 70, and are spaced apart from each other in a longitudinal direction of the arm portion 70. An operated portion 74 is provided in an lower end portion of the arm portion 70, and includes an operated surface 76 to which a depressing force is to be applied directly by a foot of the vehicle operator.

Thus, the brake pedal 10 is a so-called suspended type, and is pivotable about a pivot center that is determined by, for example, a relative positional relationship between the sub-links 44, 46. The intermediate link 42 and the brake pedal 10 are formed integrally with each other, and the intermediate link 42 is constituted by a portion of the arm portion 70 which is located between the movable joints 54, 56.

The sub-link 44 having generally an L shape is connected at its intermediate portion (i.e., curved portion) to the fixed link 40 via the joint 50, and is connected at one of its opposite end portions to the intermediate link 42 via the joint 54. The output member 60 is connected to the other of the opposite end portions of the sub-link 44.

In the present embodiment, the output member 60 serves as a pushrod that corresponds to an input member of a booster-equipped master cylinder 62 as a manual hydraulic-pressure generator. Hereinafter, the output member 60 will be referred to as the pushrod where appropriate.

When the depressing force is applied to the brake pedal 10, the depressing force is transmitted to the sub-link 44 via the movable joints 54, and then transmitted to the pushrod 60, whereby the pushrod 60 is moved forwardly. By the forward movement of the pushrod 60, a power piston (not shown) is moved forwardly and a pressurizing piston (not shown) is moved forwardly, whereby a hydraulic pressure is generated in a pressurizing chamber of the master cylinder. The hydraulic pressure generated in the pressurizing chamber of the master cylinder acts as a reaction force acting on the brake pedal 10.

In view of the above, the intermediate link 42 may be referred to as an input link while the sub-link 44 may be referred to as an output link. Further, it is not essential that the sub-link 44 is constructed to have the L shape.

The operating stroke of the brake pedal 10 is detected by a to stroke sensor 80 that is configured to detect an angle by which the sub-link 44 is pivoted about the fixed joint 50 relative to the fixed link 40 (i.e., main bracket 18). Since the angle of pivot of the sub-link 44 relative to the fixed link 40 has an one-to-one relationship with an angle of pivot of the intermediate link 42 about an instantaneous pivot center, the angle of pivot of the brake pedal 10, i.e., the stroke of the brake pedal 10 can be known based on the angle of pivot of the sub-link 44 relative to the fixed link 40. An information representing the stroke detected by the stroke sensor 80 is supplied to a brake ECU (not shown).

The brake pedal 10 is pivotable between the rearward end position and the forward end position. The rearward end position may be a home position in which the brake pedal 10 is to be positioned when the depressing force is not applied to the operated portion 74 of the brake pedal 10. For example, the rearward end position may be a position that is determined by contact of the brake pedal 10 is brought into contact with a stopper (not shown) that is provided in the pedal holding device 12.

The forward end position may be, for example, (i) a position corresponding to a forward stroke end of the pressurizing piston, i.e., a position determined by construction of the booster-equipped master cylinder 62 or (ii) a position that is distant from the rearward end position by a given distance.

Figure 2:
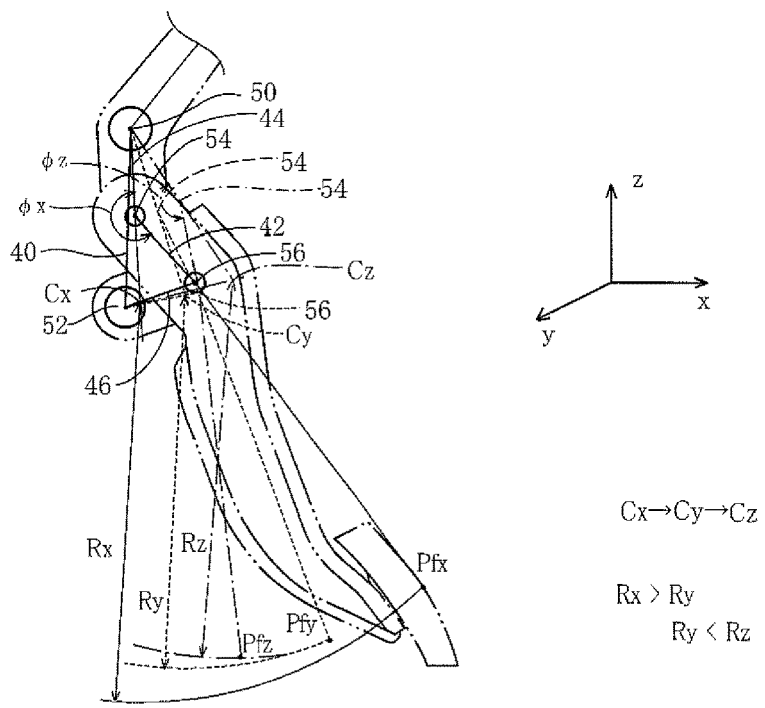
FIG. 2 is a set of views for explaining activation of the above-described pedal apparatus.
Figure 2:
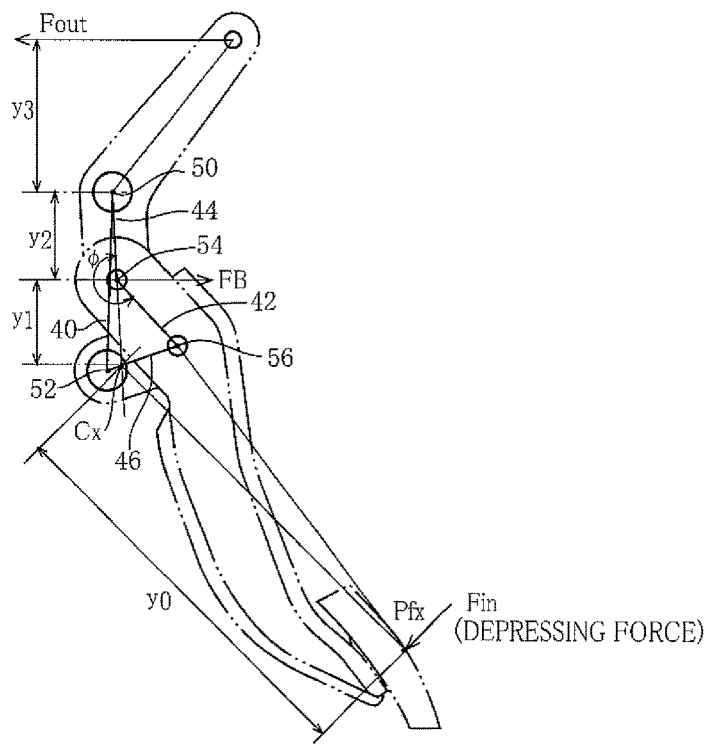

In FIG. 2 (a), the rearward end position is indicated by solid line while the forward end position is indicated by one-dot chain line. A position intermediate between the rearward and forward end positions is indicated by broken line. Also in the other embodiments described below, the rearward end position, the forward end position and the intermediate position will be indicated in the same manner. Further, in the following description, each of the pivot center C, pivot radius R, reference point Pf and position B will be referred together with one of suffixes x, y, z that are indicative of the rearward end position, intermediate position and forward end position, position, respectively, so as to clarify which one of the rearward end position, intermediate position and forward end position the referred center C, radius R, point Pf or position B relates to. The position B is a position of a predetermined portion (e.g., distal end portion) of the output member 60. However, where the center C, radius R, point Pf or position B is to be referred without relation with the rearward end position, intermediate position and forward end position, the center C, radius R, point Pf or position B will be referred without the suffixes x, y, z.

In the present embodiment, the four-bar linkage 16 has Parallel II form.

When the brake pedal 10 is positioned in the rearward end position, the movable joints 54, 56, sub-links 44, 46 and intermediate link 42 are located on a side of the fixed link 40 in the side view of the four-bar linkage (namely, located on a rear side of the fixed link 40 in the x-direction). The four links 40-46 have a relative positional relationship in which two of the four links 40-46 do not intersect with each other in the side view, so that one quadrangle is defined by cooperation of the four links 40-46. Further, as shown in FIG. 2 (a), the largest one $\phi x$ of four internal angles each defined by corresponding adjacent two {(40, 44), (44,42), (42,46), (46,40)} of the four links is not smaller than 180°, so that the four-bar linkage 16 takes Parallel II form. The largest internal angle $\phi x$ is defined by the two adjacent links 44, 42.

<Activation and Effect>

1. Regarding Operability

As shown in FIG. 2 (a), the brake pedal 10 (i.e., intermediate link 42) is held pivotably about the pivot center C. The pivot center C is a point lying on an axis which passes through an intersection of the two sub-links 44, 46 in the side view and which extends in the width direction of the vehicle (i.e., y-direction). In the four-bar linkage 16 of Parallel II form, the intersection lies on the sub-link 46, apparently in the side view, which is one of the two sub-links 44, 46 that cooperates with the intermediate link 42 to define a smaller internal angle.

When the depressing force is applied to the brake pedal 10, the intermediate link 42 is moved whereby the sub-links 44, 46 are relatively pivoted about the fixed link 40 so that the movable joint 54 is moved away from the fixed link 40. The pivot center is moved along the sub-link 46 in a direction toward the movable joint 56 (Cx→Cy). Thus, the pivot center is moved from Cx to Cy, and becomes close to the predetermined point (hereinafter referred to as a reference point) Pf lying on the depressed surface 76, whereby the pivot radius R that is a distance between the pivot center C and the reference point Pf is reduced (Rx>Ry).

When the brake pedal 10 is further depressed, the movable joint 54 becomes further far from the fixed link 40 and the internal angle φ between the intermediate link 42 and the sub-link 44 is made small. The internal angle φ is made smaller than 180° (φz<180°), so that the form of the four-bar linkage 16 becomes Parallel I form.

In Parallel I form, the pivot center C is deviated from the sub-link 46 and lies on an extension of the sub-link 46. In the present embodiment, the pivot center C becomes far from the reference point Pf, and the pivot radius R is increased (Rz>Ry).

It is common that the vehicle operator depresses the brake pedal 10 by pivoting his foot about his ankle with his heel being fixed at an initial stage of depression of the brake pedal 10. Then, when the operator has an intention for requesting a large braking force by increasing stroke of the brake pedal 10, it is common that the operator depresses the brake pedal 10 by pushing the entire foot forwardly with the heel being separated.

In the pedal apparatus according to Embodiment 1, at the initial stage of depression of the brake pedal 10, the brake pedal 10 is pivoted about the pivot center Cx so that the reference point Pf of the operated portion 74 is moved along a circular arc having the radius Rx. Since the pivot center Cx is located on a front side of the operated portion 74, it is possible to cause the reference point Pf to be moved diagonally in a forward downward direction.

When the brake pedal 10 is positioned in the rearward end position, the four-bar linkage 16 takes Parallel II form. With increase of the stroke of the brake pedal 10, the pivot center C is moved along the sub-link 46 in a direction that causes the pivot center C to become close to the reference point Pf, so that the pivot radius R is effectively reduced. Thereafter, after the form of the four-bar linkage 16 has been changed from Parallel II form to Parallel I form, with increase of the stroke of the brake pedal 10 the pivot center C is moved along the extension of the sub-link 46 in a direction that causes the pivot center C to become far from the reference point Pf, so that the pivot radius R is increased. That is, the pivot radius R is increased (Ry<Rz) after having been reduced (Rx>Ry), with increase of the stroke of the brake pedal 10. Consequently, a change of height of the reference point of the operated portion 74 (Pfy→Pfz) (in the vertical direction) upon change of the stroke of the operated portion 74 by the same amount, is made smaller when the stroke is large than when the stroke is small, so that it is possible to cause the reference point Pf to be moved substantially straight in a forward direction.

If the pivot radius is too small in a range of large stroke, the reference point Pf would be moved upwardly at a high gradient, whereby the operability could be worsened. On the other hand, in the above-described arrangement in which the pivot radius is increased in the range of large stroke, it is possible to restrain the upward movement of the reference point Pf at a high gradient and accordingly to prevent reduction of the operability.

Thus, in Embodiment 1, the form of the four-bar linkage 16 is switched from Parallel II form to Parallel I form during the movement of the brake pedal 10 from the rearward end position to the forward end position. Consequently, it is possible to cause a trajectory of the reference point Pf of the brake pedal 10 to approximate a movement of the foot of the vehicle operator and accordingly to improve the operability.

2. Regarding Pedal Ratio Characteristic

As shown in FIG. 2 (b), the depressing force (i.e., input) Fin applied to the operated portion 74 of the brake pedal 10 is transmitted to the sub-link 44 via the movable joint 54, and is then transmitted to the output member 60 so as to be inputted to the booster-equipped master cylinder 62. The input Ff inputted to the booster-equipped master cylinder 62 corresponds to a value that is obtained by multiplying the output Fout of the output member 60 by cos θ, where "θ" is an angle of inclination of the pushrod 60 with respect to an axis L of the booster-equipped master cylinder 62, as shown in FIG. 1.

$$Ff = Fout \cdot \cos\theta \qquad (1)$$

In the present specification, the term "pedal ratio γ" represents a ratio (Ff/Fin) of the input Ff (inputted to the booster-equipped master cylinder 62) to the depressing force Fin, and is obtained as described below.

Based on a balance of moment about the pivot center C in the brake pedal 10, the following expression is established:

$$y0 \cdot Fin = y1 \cdot FB \qquad (2),$$

where "y0" represents a pivot radius, i.e., a distance between the instantaneous pivot center C and the reference point Pf of the operated portion 74, "FB" represents a force acting on the movable joint 54 as a result of application of the depressing force Fin to the operated portion 74 in the brake pedal 10, and "y1" represents a length of arm of moment, i.e., a distance between the instantaneous pivot center Cx and the movable joint 54.

Based on a balance of moment about the fixed joint 50 in the sub-link 44, the following expression is established:

$$y2 \cdot FB = y3 \cdot Fout \qquad (3),$$

where "y2" represents a distance between the movable joint 54 and the fixed joint 50, and "y3" represents a length of arm of moment, i.e., a distance between the fixed joint 50 and a connected point of the output member 60.

By eliminating FB from the above expressions (2), (3), the following expression is established:

$$Fout = Fin \cdot \{(y0/y1) \cdot (y2/y3)\} \qquad (4)$$

By substituting this expression (4) into the above expression (1), the pedal ratio γ is obtained as follows:

$$\gamma = Ff/Fin = (y0/y1) \cdot (y2/y3) \cdot \cos\theta \qquad (5)$$

As shown in the above expression (5), the pedal ratio γ is obtained, based on the distances y0, y1, y2, y3 and a value of cos θ. The distances y0, y1, y3 and the value of cos θ are changed with change of the shape of the four-bar linkage 16 resulting from change of the stroke of the brake pedal 10. Thus, it is understood that the pedal ratio γ is changed with change of the stroke.

As described above, the distances y0, y1, y3 and the value of cos θ are changed with increase of the stroke, while the distance y2 is constant even with increase of the stroke. Further, it can be considered that, where the change of the distance y0 is large as compared with the changes of the distances y1, y3, the pedal ratio γ is a value which is changed mainly with the change of the distance y0, and which tends to be reduced with reduction of the distance (i.e., pivot radius) y0 and to be increased with increase of the distance y0.

Figure 4:
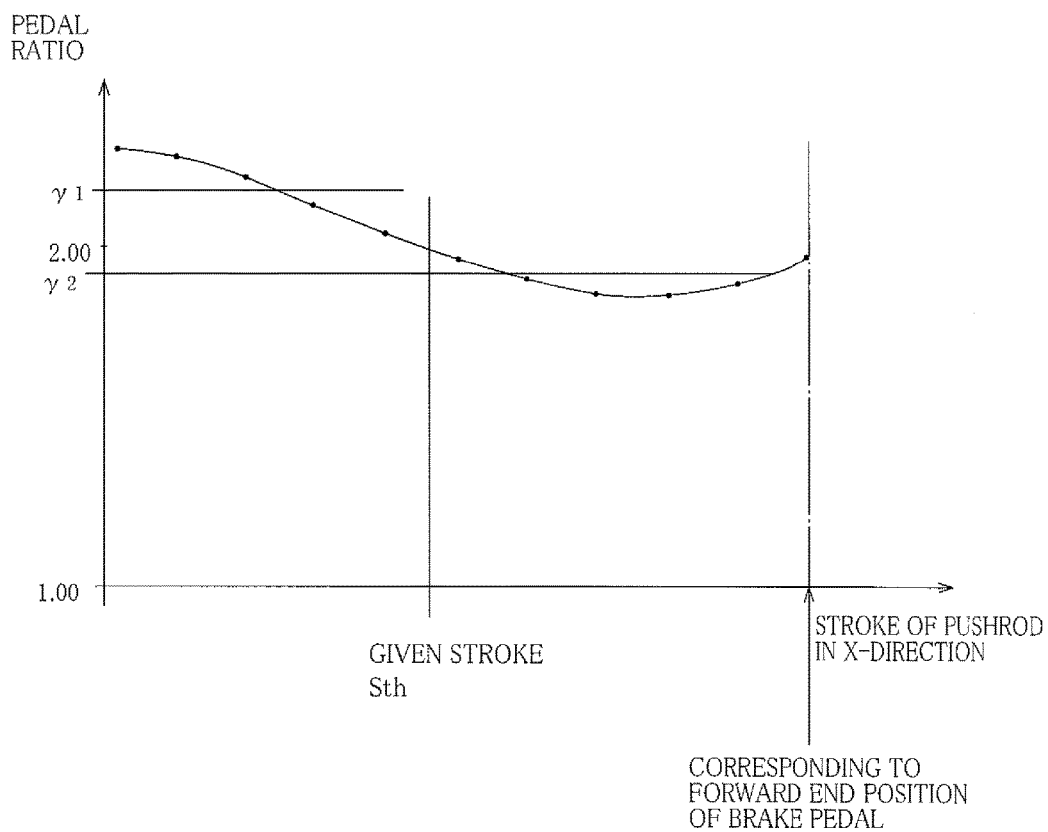
FIG. 4 is a view showing change of a pedal ratio in the above-described pedal apparatus.

FIG. 4 shows the pedal ratio characteristic of the pedal apparatus according to Embodiment 1. In general, the pedal ratio γ is smaller when the stroke of the output member 60 in the longitudinal direction (i.e., x-direction) is large than when the stroke of the output member 60 is small. Described more in detail, in a range of large stroke, the pedal ratio γ is reduced and then increased as a result of increase of the pivot radius after reduction of the pivot radius. For example, it can be said that an average value γ2 of the pedal ratio γ in a range where the stroke is larger than a given stroke Sth is smaller than an average value γ1 of the pedal ratio γ in a range where the stroke is not larger than the given stroke Sth (γ1>γ2). In other words, the given stroke Sth can be set to a value that establishes such a condition.

Thus, when the stroke becomes large, the pedal ratio γ (i.e., a ratio of an amount of forward movement of the output member 60 to an amount of increase of stroke of the reference point Pf of the pedal 10) is made relatively small, so that the control of the braking force is switched from a stroke control to a depressing force control. Consequently, in a range in which a large stroke of the pedal requesting a large braking force, it is possible to finely control the braking force and accordingly to improve a feeling given to the operator who executes a braking operation.

In the pedal apparatus according to Embodiment 1, it can be considered that the average value of the pivot radius R in a range in which the stroke is larger than the given stroke Sth is smaller than the average value of the pivot radius R in a range in which the stroke is not larger than the given stroke Sth.

Further, although the pedal ratio γ is changed as shown in FIG. 4 in Embodiment 1, this is merely an example. The manner of change of the pedal ratio γ can be modified as needed by changing specification of the four-bar linkage 16. Thus, the four-bar linkage 16 can be designed such that the pedal ratio γ is changed in accordance with a desired pattern.

3. Regarding Function for Prevention of Rearward Movement

When a large force acts on the vehicle in the longitudinal direction of the vehicle, for example, upon collision of the vehicle, the instrument panel reinforcement 24 and the main bracket 18 are relatively moved toward each other in the longitudinal direction. In this instance, the sub-bracket 20 and the main bracket 18 are pivoted relative to each other whereby the sub-link 44 is pivoted counterclockwise and the brake pedal 10 is moved forwardly. As a result of the forward movement of the brake pedal 10, it is possible to reduce a load applied to the foot of the vehicle operator in the longitudinal direction.

Although not shown in the drawings, the sub-bracket 20 is provided with an engaging portion, which is to be brought into engagement with the sub-link 44 when the sub-bracket 20 and the main bracket 18 are pivoted relative to each other.

Further, the two fixed joints 50, 52 are provided in respective positions that are distant from each other in the vertical direction of the vehicle (i.e., z-direction). In other words, the fixed link 40 is provided to take a posture extending in the vertical direction, namely, a posture inclined with respect to the longitudinal direction (i.e., x-direction). Thus, as compared with an arrangement where the fixed link 40 is provided to take a posture parallel with the longitudinal direction, it is possible to reduce a space required for installation of the pedal apparatus (i.e., a size of the pedal apparatus in the longitudinal direction) and accordingly to increase a space of the vehicle interior.

<Others>

In Embodiment 1, the four-bar linkage 16 is constructed such that the pedal ratio γ is reduced and then increased with increase of stroke of the brake pedal 10 in a period of movement of the brake pedal 10 from the rearward end position to the forward end position. However, it is not essential to design the construction of the four-bar linkage 16 like this. The four-bar linkage 16 may be constructed also such that the pedal ratio γ is simply reduced with increase of stroke of the brake pedal 10.

Further, it is not essential that the output member is constituted by the pushrod. The output member may be constituted by an input member of a stroke simulator. That is, in a brake system where brakes provided for wheels are controlled electrically based on an operational state of the brake pedal operated by a vehicle operator (e.g. a brake system with electric brakes where each of the brakes is activated by an electric motor, a brake system with hydraulic brakes where a hydraulic pressure level of each of the brakes is controlled electrically), the brake action force is controlled based on, for example, the stroke detected by the stroke sensor 80, so that it is not essential to cause the booster-equipped master cylinder 62 to be activated with operation of the brake pedal 10.

Further, a reaction-force applying device may be provided within the brake pedal apparatus such that a reaction force is applied from the reaction-force applying device to the brake pedal 10. In this case, the provision of the connection portion per se connected to the output member 60 would not be necessary. For example, it is possible to provide a resistance applying device (e.g., mechanism utilizing a spring and a fluid) around one of the fixed joints such that a resistance is applied from the resistance applying device to the brake pedal 10 when two links are rotated relative to each other. In this case, the forward end position of the brake pedal 10 can be set to an arbitrary position, for example, by employing an arrangement in which the pedal holding device 12 is provided with a stopper that defines the forward end position of the brake pedal 10 so that the arbitrary position is defined by the stopper. The forward end position of the brake pedal 10 may be a position that is located on a front side of the rearward end position and distant from the rearward end position by a given distance, wherein the given distance may be a value that is determined, for example, based on human dynamics.

Embodiment 2

Figure 5:
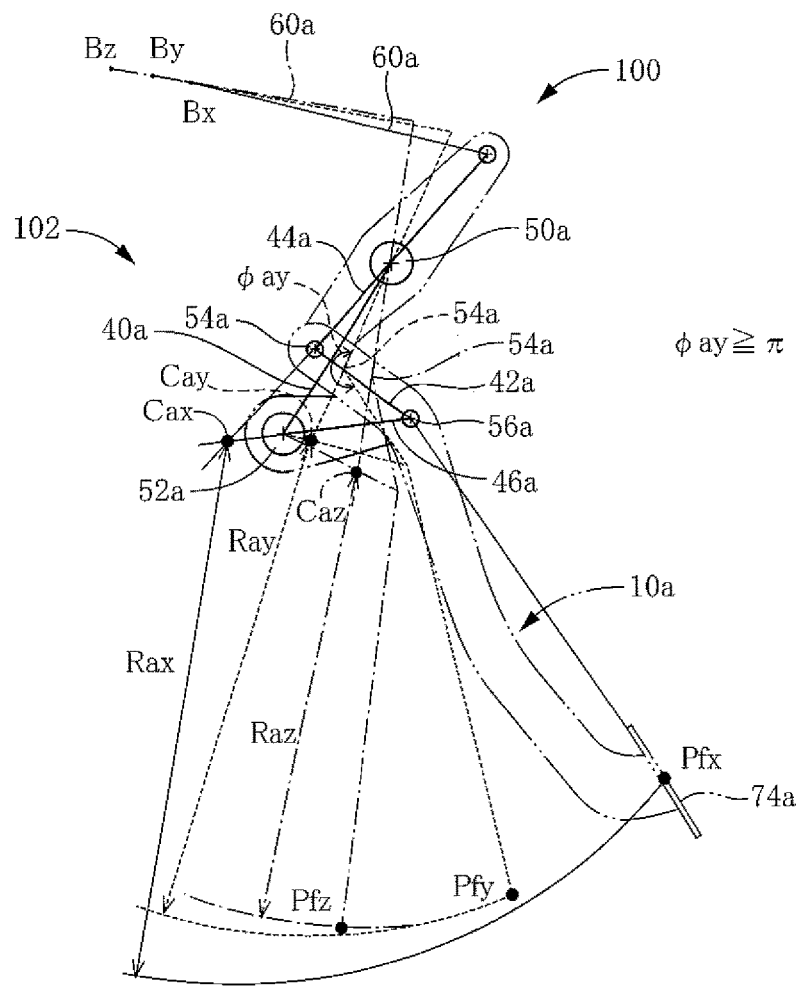
FIG. 5 is a view showing a major portion of a pedal apparatus including a pedal holding device that is constructed according to Embodiment 2.

FIG. 5 shows a major portion of a pedal apparatus according to Embodiment 2. The other portions, which are substantially the same as those of Embodiment 1, will not be described and not be shown in the drawings.

A pedal holding device 100 includes a four-bar linkage 102 of Watt's form. The form of the four-bar linkage 102 is changed from Watt's form to Parallel II form as the stroke of a brake pedal 10a is increased.

When the brake pedal 10a is positioned in the rearward end position, two fixed joints 50a, 52a are located in respective positions that are distant from each other in the vertical direction (i.e., z-direction), and a fixed link 40a takes a posture extending between the two fixed joints 50a, 52a in a direction including a component of the vertical direction. The movable joints 54a, 56a are located in respective opposite sides of the fixed link 40a in the longitudinal direction (i.e., x-direction). Similarly, the sub-links 44a, 46a are also located in respective opposite sides of the fixed link 40a in the longitudinal direction. Consequently, the fixed link 40a and the intermediate link 42a intersect with each other apparently in the side view of the four-bar linkage 102, so that the four-bar linkage 102 takes Watt's form.

When the brake pedal 10a is depressed, the intermediate link 42 is moved and the movable joint 54a is moved rearwardly (in the x-direction). When the movable joint 54a passes over the fixed link 40a so as to be located on the same side of the fixed link 40a as the movable joint 56a, the fixed link 40a and the intermediate link 42a establish a relative positional relationship in which the fixed link 40a and the intermediate link 42a do not apparently intersect with each other. The largest one ϕa of the internal angles becomes not smaller than 180°, so that the four-bar linkage 102 takes Parallel II form.

In Watt's form, the pivot center C is located in a position (Cax) that is deviated from the sub-link 46a. In a transition of the form of the four-bar linkage 102 from Watt's form to Parallel II form, the pivot center C becomes close to the sub-link 46a. After the form of the four-bar linkage 102 has become Parallel II form, the pivot center C is moved on the sub-link 46a in a direction away from the fixed joint 52a (Cay→Caz). The pivot center C becomes close to the reference point Pf so that the pivot radius Ra is reduced (Rax>Ray>Raz).

Thus, also in the pedal apparatus according to the present embodiment, it is possible to cause the reference point Pf of the brake pedal 10a to be moved in a trajectory along a movement of the foot of the vehicle operator and accordingly to improve the operability.

Further, the output member 60a is moved forwardly with increase of the stroke of the brake pedal 10a, whereby the hydraulic pressure of the booster-equipped master cylinder 62 is increased. The position of the predetermined portion of the output member 60a is indicated by Bx, By, Bz.

In the four-bar linkage 102 of the present embodiment, the forward end position may be shifted forwardly so that the form of the four-bar linkage 102 is changed from Parallel II form to Parallel I form. In this case, during the period of movement of the brake pedal 10a from the rearward end position to the forward end position, the form of the four-bar linkage 102 is changed from Watt's form to Parallel II form and then changed from Parallel II form to Parallel I form.

Embodiment 3

Figure 6:
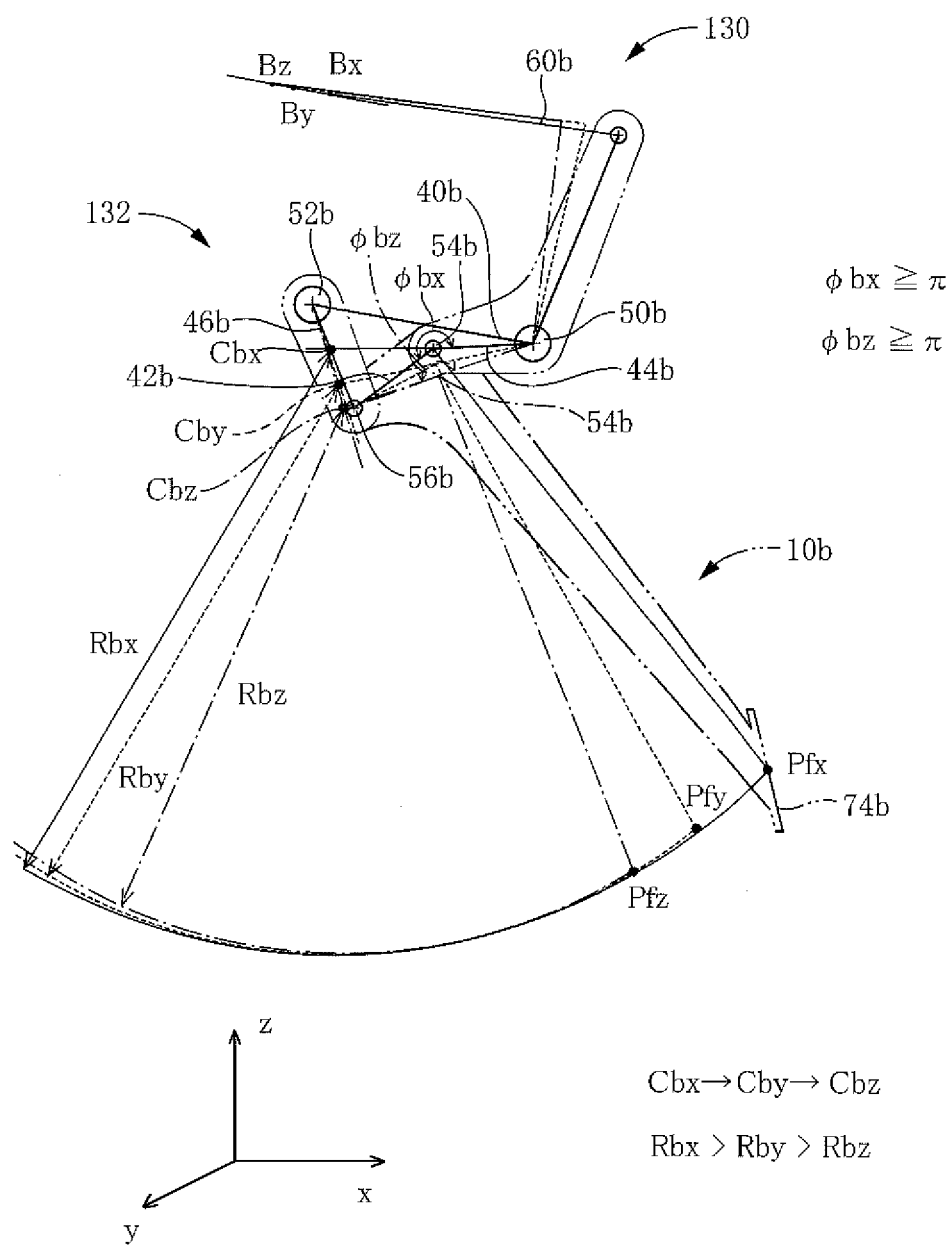
FIG. 6 is a view showing a major portion of a pedal apparatus including a pedal holding device that is constructed according to Embodiment 3.

FIG. 6 shows a major portion of a pedal apparatus according to Embodiment 3. The other portions, which are substantially the same as those of Embodiment 1, will not be described and not be shown in the drawings.

A pedal holding device 130 includes a four-bar linkage 132 of Parallel II form. The four-bar linkage 132 maintains Parallel II form within a range of operating stroke of a brake pedal 10b.

A fixed link 40b is provided to take a posture extending generally in the longitudinal direction. When the brake pedal 10b is positioned in the rearward end position, movable joints 54b, 56b, sub-links 44b, 46b, an intermediate link 42b and an operated portion 74b are located on one side of the fixed link 40b (i.e., a lower side of the fixed link 40b in the z-direction) in the side view. This relative positional relationship is maintained during the period of movement of the brake pedal 10b from the rearward end position to the forward end position.

When the brake pedal 10b is positioned in the rearward end position, the internal angle ϕb defined between the intermediate link 42b and the sub-link 44b is not smaller than 180° in the side view, so that the four-bar linkage 132 takes Parallel II form.

When the brake pedal 10b is depressed, the movable joint 54b is moved away from the fixed link 40b (namely, moved downwardly), so that the internal angle ϕb defined between the intermediate link 42b and the sub-link 44b is reduced. However, in the present embodiment, since the brake pedal 10b reaches the forward movement end before the largest one ϕb of the internal angles becomes smaller than 180°, the four-bar linkage 132 maintains Parallel II form.

As long as the four-bar linkage 102 takes Parallel II form, the pivot center Cb lies apparently on the sub-link 46b (Cbx→Cby→Cbz). Further, the pivot center Cb is moved in a direction that causes the pivot center Cb to become close to the reference point Pf, so that the pivot radius Rb is reduced (Rbx>Rby>Rbz).

As described above, in the present embodiment, it is possible to cause a trajectory of the reference point Pf of the brake pedal 10b to approximate a movement of the foot of the vehicle operator who operates the brake pedal 10b, and accordingly to improve the operability.

It is noted that the forward end position of the brake pedal 10b may be shifted forwardly from a position indicated in the drawing, so that the form of the four-bar linkage 132 can be changed from Parallel II form to Parallel I form. Thus, the change of the form resulting in the change of the shape of the four-bar linkage is dependent on the construction of the four-bar linkage and also a range of operation of the brake pedal 10b.

Embodiment 4

Figure 7:
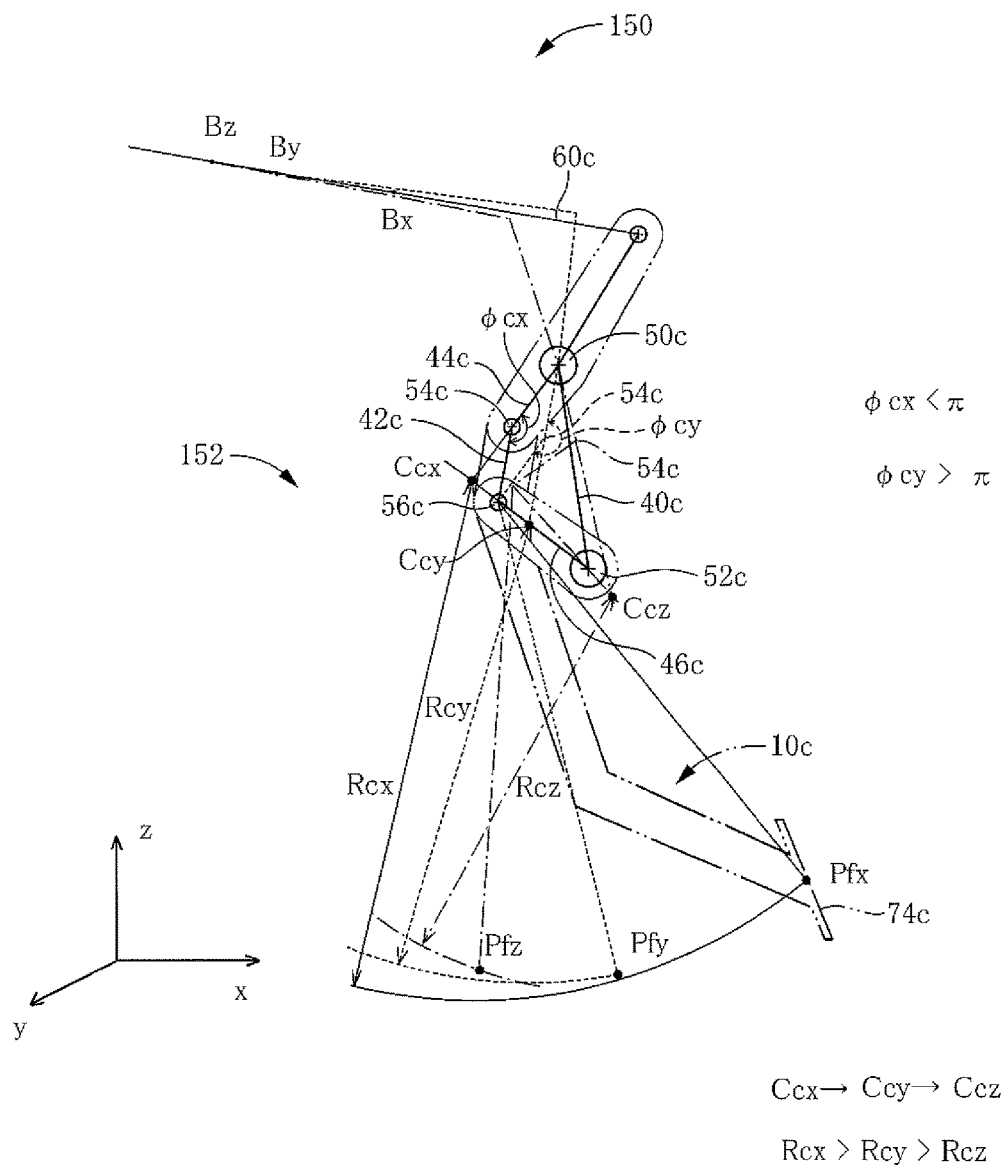
FIG. 7 is a view showing a major portion of a pedal apparatus including a pedal holding device that is constructed according to Embodiment 4.

FIG. 7 shows a major portion of a pedal apparatus according to Embodiment 4. The other portions, which are substantially the same as those of Embodiment 1, will not be described and not be shown in the drawings.

A pedal holding device 150 includes a four-bar linkage 152 of Parallel I form. With increase of the operating stroke of a brake pedal 10c, the form of the four-bar linkage 152 is changed to Parallel II form and Watt's form.

A fixed link 40c is provided to take a posture extending generally in the vertical direction. When the brake pedal 10c is positioned in the rearward end position, movable joints 54c, 56c, sub-links 44c, 46c and an intermediate link 42c are located on one side of the fixed link 40c (i.e., a front side of the fixed link 40c in the x-direction) in the side view. The four links 40c-46c cooperate with one another to define a shape close to a trapezoid in the side view, and all of internal angles (each defined by corresponding two adjacent links) are smaller than 180° (namely, even the largest one ϕcx of the internal angles is smaller than 180°), so that the four-bar linkage 152 takes Parallel I form.

When a depressing force is applied to an operated portion 74c of the brake pedal 10c, the intermediate link 42c is moved to cause the movable joint 54c to become close to the fixed link 40c whereby the largest internal angle ϕc defined between the sub-link 44c and the intermediate link 42c is increased to become not smaller than 180° (ϕcy>180°). Thus, the form of the four-bar linkage 152 becomes Parallel II form.

When the stroke of the brake pedal 10c is further increased, the movable joint 54c passes over the fixed link 40c so as to be located on a rear side of the fixed link 40c in the side view. Consequently, the intermediate link 42c and the fixed link 40c apparently intersect with each other, whereby the form of the four-bar linkage 152 is changed to Watt's form.

The pivot center is moved (Ccx→Ccy→Ccz) whereby the pivot radius Rc is reduced (Rcx>Rcy>Rcz).

As described above, in the present embodiment, the pivot radius Rc is reduced with increase of stroke of the brake pedal 10c, so that it is possible to cause a trajectory of the reference point Pf of the brake pedal 10c to approximate a movement of the foot of the vehicle operator and accordingly to improve the operability.

Further, since the fixed link 40c is provided to take a posture extending generally in the vertical direction, with the fixed joints 50c, 52c being spaced apart from each other in the vertical direction (i.e., z-direction), it is possible to reduce a space required for installation of the pedal apparatus in the longitudinal direction and accordingly to widen the vehicle interior.

Embodiment 5

Figure 8:
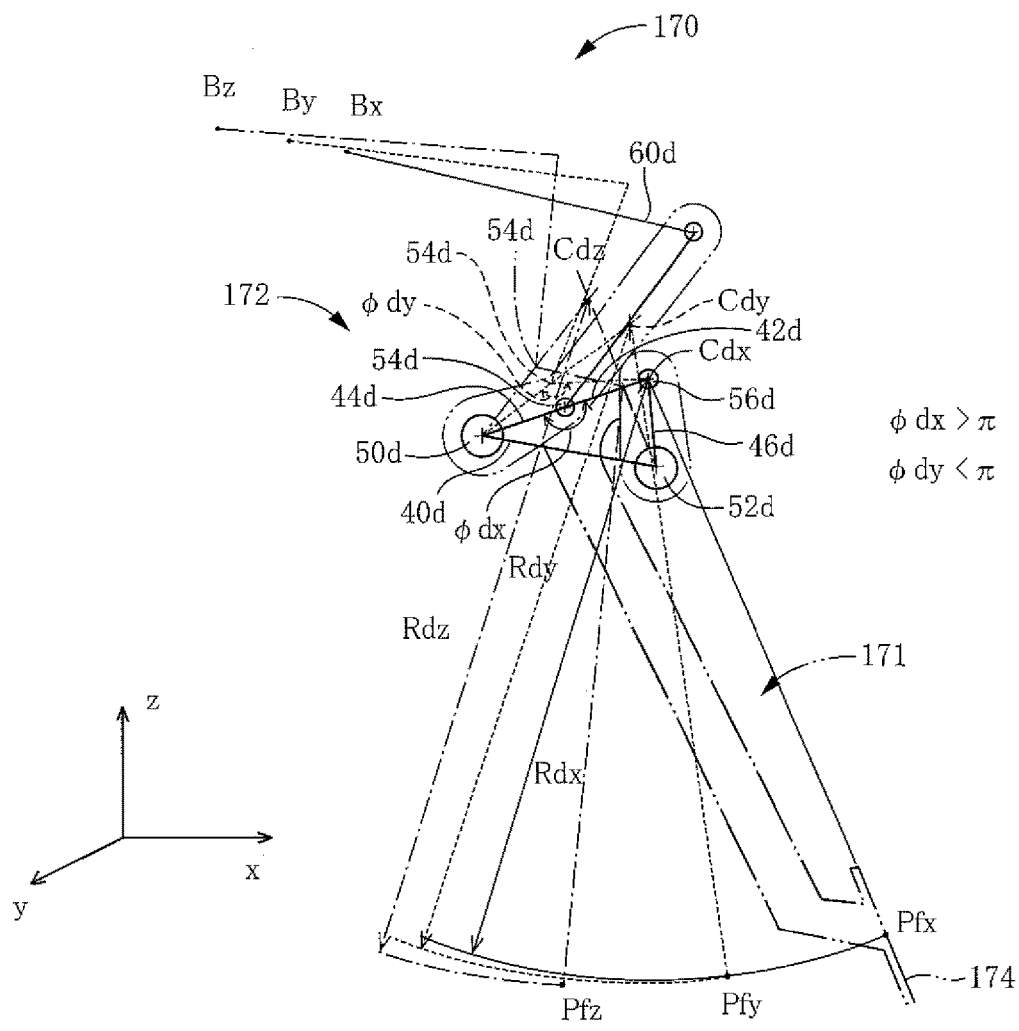
FIG. 8 is a view showing a major portion of a pedal apparatus including a pedal holding device that is constructed according to Embodiment 5.

FIG. 8 shows a major portion of a pedal apparatus according to Embodiment 5.

The pedal apparatus according to the present embodiment is a clutch pedal apparatus including a pedal holding device 170 and a clutch pedal 171 as the pedal. The pedal holding device 170 includes a four-bar linkage 172 of Parallel II form. With increase of the stroke of the clutch pedal 171, the form of the four-bar linkage 172 is changed to Parallel I form.

A fixed link 40d is provided to take a posture extending generally in the longitudinal direction. When the clutch pedal 171 is positioned in the rearward end position, movable joints 54d, 56d, sub-links 44d, 46d and an intermediate link 42d are located on one side of the fixed link 40d (i.e., an upper side of the fixed link 40b in the z-direction) in the side view. An angle (i.e., the largest internal angle) φdx defined between the intermediate link 42d and the sub-link 44b is 180° (φdx=180°), so that the four-bar linkage 172 takes Parallel II form.

When a depressing force is applied to an operated portion 174 of the clutch pedal 171, the movable joint 54d is moved upwardly away from the fixed link 40d whereby the internal angle φd is reduced. When the internal angle φd becomes smaller than 180° (φdy<180°), the form of the four-bar linkage 172 becomes Parallel I form.

The pivot center C is moved in a direction (i.e., upward direction) away from the fixed joint 52d, i.e., a direction away from the operated portion 174 (Cdx→Cdy→Cdz). Therefore, in the present embodiment, the pivot radius R is increased (Rdx<Rdy<Rdz) with increase of the stroke of the clutch pedal 171.

When the vehicle operator operates the clutch pedal 171, it is common that the operator moves the foot substantially straight while floating the heel. Since the pivot radius is increased with increased of the stroke of the clutch pedal 171, the trajectory of the reference point Pf of the clutch pedal 171 becomes close to a straight line.

Therefore, in the pedal apparatus according to Embodiment 5, it is possible to cause the trajectory of the reference point Pf of the clutch pedal 171 to approximate a movement of the foot of the vehicle operator who operates the clutch pedal, and accordingly to improve an operability of the clutch pedal.

It is noted that an output member 60d is connected to a clutch (not shown).

Embodiment 6

Figure 9:
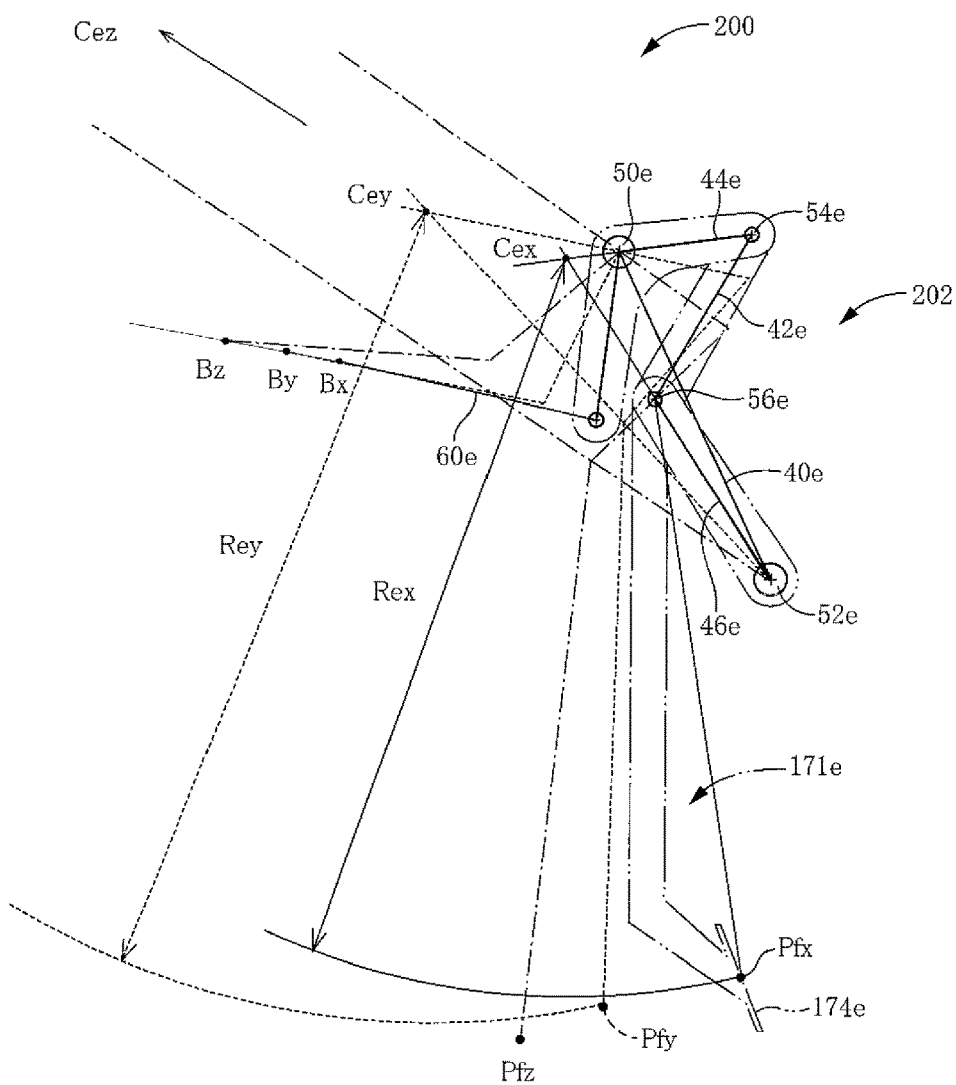
FIG. 9 is a view showing a major portion of a pedal apparatus including a pedal holding device that is constructed according to Embodiment 6.

FIG. 9 shows a major portion of a pedal apparatus according to Embodiment 6.

The pedal apparatus according to Embodiment 6 includes a pedal holding device 200 and a clutch pedal 171e as the pedal. The pedal holding device 200 includes a four-bar linkage 202 of Watt's form.

In the four-bar linkage 202, when the clutch pedal 171e is positioned in the rearward end position, movable joints 54e, 56e are located on respective opposite sides of a fixed link 40e that apparently intersects with an intermediate link 42e so that the four-bar linkage 202 takes Watt's form. The intermediate link 42e is provided with a clutch pedal 171e. When the clutch pedal 171e is depressed, the movable joints 54e, 56e are moved. However, their relative positional relationship is not changed within a range of operation of the clutch pedal 171e, so that Watt's form is kept even when the stroke of the clutch pedal 171e is increased.

Further, with increase of the stroke of the clutch pedal 171e, the pivot center Ce is moved in a direction away from the fixed joint 50e whereby the pivot radius Re is increased (Rex<Rey<Rez). It is noted that the pivot center Cez is not shown in the drawing since the pivot center Cez is located outside the drawing sheet.

Thus, in the present embodiment, the pivot radius is increased with increase of stroke of the clutch pedal 171e so that it is possible to improve operability of the clutch pedal 171e.

It is noted that the pedal holding device may include a four-bar linkage of Watt's form in which two sub-links intersect with each other.

There have been described the plurality of embodiments, merely, by way of examples. The present invention can be carried out in any pedal holding devices each including a four-bar linkage having any one of various constructions of various modifications and improvements that will be made based on knowledge of a person skilled in the art.

DESCRIPTION OF REFERENCE SIGNS

10: brake pedal 12, 100, 130, 150, 170, 200: pedal holding device 14: main body of the pedal holding device 16, 102, 132, 152, 172, 202: four-bar linkage 18: main bracket 20: sub-bracket 40-46: links 50-56: joints 60: output member 80: stroke sensor 171: clutch pedal

The invention claimed is:
1. A pedal apparatus comprising:
   a pedal;
   a four-bar linkage including four links and four joints that connect the four links; and
   another joint that is other than the four joints included in the four-bar linkage, wherein
   the four joints include two fixed joints that are provided in a main body of the pedal apparatus and two movable joints that are not provided in the main body;
   the four links include a fixed link that is a portion of the main body located between the two fixed joints, an intermediate link that is not connected to either of the two fixed joints, and two sub-links that are connected to the fixed link via the respective two fixed joints and that are connected to the intermediate link via the respective two movable joints;
   the pedal is fixed to the intermediate link such that the pedal is not pivotable relative to the intermediate link;
   the fixed link extends generally in a vertical direction;
   the pedal is a brake pedal;
   one of the two sub-links is connected at one end portion thereof to the intermediate link via one of the two movable joints, further connected at an intermediate portion thereof to the fixed link via one of the two fixed joints, and further connected at another end portion thereof via said another joint to an output member configured to output a force corresponding to an input applied to the brake pedal to an external device;
   the one of the two fixed joints is positioned on an upper side of the other of the two fixed joints;

said another joint is located outside an area surrounded by the four joints;
the one of the two sub-links has generally an L-shape; and
the one of the two sub-links is connected at a curved portion of the L-shape to the fixed link via the one of the two fixed joints.

2. The pedal apparatus according to claim 1, wherein the four-bar linkage is constructed such that, the two movable joints are positioned on a side of the fixed link and one of four internal angles is not smaller than 180°, each of the four internal angles being defined by corresponding adjacent two of the four links, the one of the four internal angles being defined by the intermediate link and the one of the two sub-links.

3. The pedal apparatus according to claim 1, wherein said another joint is located on an upper side of the one of the fixed joints and is provided on the one of the sub-links at a position located on an opposite side of the one of the fixed joints from the one of the movable joints.

4. The pedal apparatus according to claim 1, wherein the fixed link as one of the four links has a length larger than a length of each of the other of the four links.

5. The pedal apparatus according to claim 1, wherein the pedal includes an arm portion; and
the arm portion and the intermediate link are integral with each other.

6. A pedal apparatus comprising:
a pedal;
a four-bar linkage including four links and four joints that connect the four links; and
another joint that is other than the four joints included in the four-bar linkage, wherein
the four joints include two fixed joints that are provided in a main body of the pedal apparatus and two movable joints that are not provided in the main body;
the four links include a fixed link that is a portion of the main body located between the two fixed joints, an intermediate link that is not connected to either of the two fixed joints, and two sub-links that are connected to the fixed link via the respective two fixed joints and that are connected to the intermediate link via the respective two movable joints;
the pedal is fixed to the intermediate link such that the pedal is not pivotable relative to the intermediate link;
the fixed link extends generally in a vertical direction;
the pedal is a brake pedal;
one of the two sub-links is connected at one end portion thereof to the intermediate link via one of the two movable joints, further connected at an intermediate portion thereof to the fixed link via one of the two fixed joints, and further connected at another end portion thereof via said another joint to an output member configured to output a force corresponding to an input applied to the brake pedal to an external device;
the one of the two fixed joints is positioned on an upper side of the other of the two fixed joints;
said another joint is located outside an area surrounded by the four joints;
the one of the two sub-links extends substantially straight; and
the one of the two movable joints, the one of the two fixed joints, and said another joint are arranged in a straight line.

7. A pedal apparatus comprising:
a pedal;
a four-bar linkage including four links and four joints that connect the four links; and
another joint that is other than the four joints included in the four-bar linkage, wherein
the four joints include two fixed joints that are provided in a main body of the pedal apparatus and two movable joints that are not provided in the main body;
the four links include a fixed link that is a portion of the main body located between the two fixed joints, an intermediate link that is not connected to either of the two fixed joints, and two sub-links that are connected to the fixed link via the respective two fixed joints and that are connected to the intermediate link via the respective two movable joints;
the pedal is fixed to the intermediate link such that the pedal is not pivotable relative to the intermediate link;
the fixed link extends generally in a vertical direction;
the pedal is a brake pedal;
one of the two sub-links is connected at one end portion thereof to the intermediate link via one of the two movable joints, further connected at an intermediate portion thereof to the fixed link via one of the two fixed joints, and further connected at another end portion thereof via said another joint to an output member configured to output a force corresponding to an input applied to the brake pedal to an external device;
the one of the two fixed joints is positioned on an upper side of the other of the two fixed joints;
said another joint is located outside an area surrounded by the four joints; and
said another joint is located on an upper side of the two fixed joints.

8. A pedal apparatus comprising:
a pedal;
a four-bar linkage including four links and four joints that connect the four links; and
another joint that is other than the four joints included in the four-bar linkage, wherein
the four joints include two fixed joints that are provided in a main body of the pedal apparatus and two movable joints that are not provided in the main body;
the four links include a fixed link that is a portion of the main body located between the two fixed joints, an intermediate link that is not connected to either of the two fixed joints, and two sub-links that are connected to the fixed link via the respective two fixed joints and that are connected to the intermediate link via the respective two movable joints;
the pedal is fixed to the intermediate link such that the pedal is not pivotable relative to the intermediate link;
the fixed link extends generally in a vertical direction;
the pedal is a brake pedal;
one of the two sub-links is connected at one end portion thereof to the intermediate link via one of the two movable joints, further connected at an intermediate portion thereof to the fixed link via one of the two fixed joints, and further connected at another end portion thereof via said another joint to an output member configured to output a force corresponding to an input applied to the brake pedal to an external device;
the one of the two fixed joints is positioned on an upper side of the other of the two fixed joints;
said another joint is located outside an area surrounded by the four joints; and
said another joint is located on an upper side of the one of the two fixed joints and is provided on the one of the two sub-links at a position located on an opposite side of the one of the two fixed joints from the one of the two movable joints.

* * * * *